(12) United States Patent
Nakashima et al.

(10) Patent No.: US 6,904,362 B2
(45) Date of Patent: Jun. 7, 2005

(54) ROUTE GUIDANCE SYSTEM, INFORMATION DELIVERY CENTER, AND VEHICULAR ROUTE GUIDANCE APPARATUS

(75) Inventors: Hideki Nakashima, Aichi (JP); Hiroyoshi Masuda, Aichi (JP); Akira Ishida, Aichi (JP); Yoichi Hayama, Aichi (JP)

(73) Assignee: Aisin Aw Co., Ltd. (JP)

( * ) Notice: Subject to any disclaimer, the term of this patent is extended or adjusted under 35 U.S.C. 154(b) by 0 days.

(21) Appl. No.: 10/214,389

(22) Filed: Aug. 8, 2002

(65) Prior Publication Data

US 2003/0033083 A1 Feb. 13, 2003

(30) Foreign Application Priority Data

| Aug. 9, 2001 | (JP) | 2001-241746 |
| Aug. 10, 2001 | (JP) | 2001-243427 |
| Aug. 10, 2001 | (JP) | 2001-245047 |

(51) Int. Cl.[7] .................... G01C 21/00; G08G 1/123
(52) U.S. Cl. .................... 701/211; 701/206; 701/208; 701/209; 701/210; 701/211; 340/995.1; 340/995.12; 340/995.18; 340/995.19; 340/995.2; 340/995.21; 340/996
(58) Field of Search .................... 701/211, 206, 701/208, 209, 210; 340/995.1, 995.17, 995.18, 995.2, 995.21, 996

(56) References Cited

U.S. PATENT DOCUMENTS 6,484,093 B1 * 11/2002 Ito et al. .................... 701/211
6,526,284 B1 * 2/2003 Sharp et al. .................... 455/456.6
6,594,580 B1 * 7/2003 Tada et al. .................... 701/211

FOREIGN PATENT DOCUMENTS

| JP | 10-019588 | 1/1998 |
| JP | 2001-147132 | 5/2001 |

* cited by examiner

*Primary Examiner*—Thomas G. Black
*Assistant Examiner*—Brian J. Broadhead
(74) *Attorney, Agent, or Firm*—Lorusso & Loud

(57) ABSTRACT

An information center generates packets of route guidance information, each corresponding to a prescribed road length of a recommended route. The information center may generate major guide point information and guidance information and transmit both to a vehicular apparatus. The vehicular apparatus provides guidance only for major guide points based on the received major guide point information if it cannot receive the guidance information. According to another aspect of the invention, if the end of a route segment which was the subject of the preceding route guidance information is on an expressway or toll road, guidance information for a preliminary route from that end to an escape position ahead on the expressway or toll road is first transmitted and then information for a remaining route, that is a segment of the recommended route having the prescribed road length minus the preliminary route, is then transmitted. If communication with the information center is lost, the vehicular apparatus performs guidance for the preliminary route to an interchange, for example, of the expressway using the preliminary route guidance information.

20 Claims, 16 Drawing Sheets

ROUTE GUIDANCE SYSTEM, INFORMATION DELIVERY CENTER, AND VEHICULAR ROUTE GUIDANCE APPARATUS

BACKGROUND OF THE INVENTION

1. Field of the Invention

The present invention relates to a route guidance system and method for route guidance to a destination, to a related information delivery center, and to a vehicular route guidance apparatus. More specifically, the invention relates to a route guidance system in which a vehicular route guidance apparatus having stored road data provides a guidance display for a route to a destination while in communication with an information delivery center also having road data, as well as to such an information delivery center and vehicular route guidance apparatus.

2. Description of the Related Art

In a conventional navigation apparatus that is provided in a vehicle such as an automobile, when an operator has set a destination by operation of an input section, a route from a detected present position to the destination is searched for and route guidance is provided for the thus determined route. The route is usually determined so as to minimize the distance to be covered from the present position to the destination or to minimize the travel time.

In a conventional communication-type navigation system route guidance is performed by communication between an information center having road information and a navigation apparatus provided on a vehicle (Japanese Patent Laid-Open No. 19588/1998). In such a system, the information center reads necessary information from a database, responsive to a request from the vehicular apparatus, and generates a map image. The information center also generates information indicating an optimum route by performing a route search. The generated map image and information indicating the optimum route are sent from the information center to the vehicular apparatus and displayed on a display of the vehicular apparatus.

In such systems, the configuration of the vehicular apparatus is simplified because the vehicular apparatus need not be equipped with a database. Since the database that is maintained in the information center is updated frequently, route search results and map information that are generated based on the latest information can always be supplied to the operator.

However, because the map images and information for guidance along an optimum route are communicated from the information center to the vehicular apparatus, if the vehicle is running in an area where communication cannot be performed properly or at all, e.g., when a system is down or another problem arises in the information center, communication between the information center and the vehicular apparatus is interrupted and the vehicular apparatus cannot receive map images and information necessary for providing route guidance.

In a known navigation system that solves the problem, when communication between the information center and the vehicular apparatus cannot be performed, route guidance is continued by using map information in a storage medium such as a CD-ROM or a DVD-ROM which is provided in the vehicular apparatus (Japanese Patent Laid-Open No. 2001-147132). However, if the map information stored in the storage medium of the vehicular apparatus is old and the information center has performed a route search based on new information that is not included in that map information, route guidance that is continued by using the map information stored in the storage medium of the vehicular apparatus will be improper.

Assume a case wherein communication between the information center and the vehicular apparatus is disabled in the middle of a guidance operation for an optimum route that was found by a route search in the information center and includes a new expressway. In this case, the vehicular apparatus attempts to display a route based on the previously received information indicating the optimum route and using the map information stored in the storage medium of the vehicular apparatus. However, since the map information stored in the storage medium of the vehicular apparatus has not been updated and therefore does not include the new expressway, the vehicular apparatus cannot display a route including the new expressway on the display means. As a result, the vehicular apparatus continues the route guidance by displaying a route including another, closest road such as an ordinary road, in place of the new expressway, and the route guidance becomes improper. Further, the vehicular apparatus generates route guidance information by performing map matching and a route search using the road data etc. stored in the recording medium. As a result, the vehicular apparatus displays a vehicle present position on the substituted closest road that is recorded within the vehicular apparatus rather than on the new expressway and performs route guidance from that misplaced present position.

SUMMARY OF THE INVENTION

The object of the present invention is to solve the above-described problems. Accordingly, the present invention provides a route guidance system (navigation system) capable of performing proper guidance even in a situation wherein communication between a vehicular route guidance apparatus and an information delivery center is not available and hence the vehicular route guidance apparatus cannot acquire route guidance information from the information delivery center.

According to one aspect of the invention, a navigation system is provided which includes an information center having a transmission/reception section for communication, a route search section for searching for a route, and an information generating section for generating major guide point information and guidance information for the route thus found. The information center searches for an optimum route based on a received present position and destination and generates and transmits the major guide point information and the guidance information. The navigation further includes a vehicular apparatus having a transmission/reception section for performing communication, a destination setting section for setting a destination, a present position judging section for determining the present position, and a guidance output section for producing guidance output for major guide points and route guidance output for guidance along the route. The vehicular apparatus serves to transmit the destination and the present position, to receive the major guide point information and the guidance information, and to give guidance for the major guide points when unable to receive the guidance information.

In another aspect the present invention provides an information center which has a transmission/reception section for communication; a route search section for searching for a route; and an information generating section for generating information for major guide points and guidance information for the route found by its search. The information center searches for the route based on a present position and a destination that are received from a vehicular apparatus and generates and transmits the information for the major guide points and guidance information to the vehicular apparatus.

In yet another aspect the present invention provides a vehicular apparatus which includes a transmission/reception section for communication, a destination setting section for setting a destination, a present position determination section for determining a present position and a guidance output section for producing guidance output for major guide points and route guidance output for guidance along the route. The vehicular apparatus transmits the destination and the present position to an information center, receives, from the information center, guide point information for major guide points and guidance information for the route that has been found by a search based on the destination and the present position, and gives guidance for the major guide points when unable to receive the guidance information.

According to the present invention, even when the communication between the information center and the vehicular apparatus has been disabled, proper guidance can be performed by giving guidance for major guide points.

According to still another aspect of the invention, a route guidance system is provided which includes an information delivery center for generating route guidance information for route guidance from a present position to a destination in response to a request from a vehicular route guidance apparatus and for transmitting the generated route guidance information to the vehicular route guidance apparatus. The information delivery center has search means for searching for a route ("recommended route" or "guidance route") from the present position to the destination, preliminary route guidance information generating means for generating, if the guidance of a preceding route guidance communication ended on an expressway or toll road, preliminary route guidance information for a preliminary route from that end to an exit position ahead, in generating route guidance information corresponding to a prescribed road length of the route that has been found by the search means. The information delivery center further includes remaining route guidance information generating means for generating remaining route guidance information for a "remaining route" which is a segment of the recommended route having the prescribed road length minus the preliminary route; and transmitting means for first transmitting the preliminary route guidance information to the vehicular route guidance apparatus and then transmitting the remaining route guidance information to the vehicular route guidance apparatus. The vehicular route guidance apparatus which provides the user with route guidance, based on the route guidance information transmitted from the information delivery center, includes route guidance means for providing route guidance for the recommended route ahead of the end of the route segment for which complete guidance was last provided by transmission from the information delivery center, in circumstances wherein communication with the information delivery center is not possible, to an escape position for the expressway or toll road using the preliminary route guidance information that has been first received. According to this aspect of the invention, when the communication between the information delivery center and the vehicular route guidance apparatus is disrupted and route guidance information for part of a toll road (or expressway) ahead of the vehicle present position can not be displayed, preliminary route guidance is performed from that present position to an escape position ahead by using preliminary route guidance information. This can prevent improper route guidance wherein the vehicle present position would be displayed on the screen without that part of a new toll road (or expressway) ahead of its position, for which guidance can not be properly displayed, as in the case where the data for the new toll road (or expressway) is not stored in the road data storing means of the vehicular route guidance apparatus.

According to another aspect of the invention, an information center is provided which, each time information for a present position and a destination is received from a vehicular route guidance apparatus, generates route guidance information corresponding to a prescribed road length for route guidance from the present position to the destination, and transmits the generated route guidance information to the vehicular route guidance apparatus. The information delivery center includes search means for searching for a route from the present position to the destination ("recommended route" or "guidance route"); preliminary route guidance information generating means for generating, if an end of a segment of the recommended route (prescribed road length) covered by the immediately preceding route guidance information is on an expressway or toll road, preliminary route guidance information for a preliminary route from that end to an escape position ahead. The information delivery center also has remaining route guidance information generating means for generating remaining route guidance information for a "remaining route", i.e., a segment of the recommended route having the prescribed road length minus the preliminary route; and transmitting means for first transmitting the preliminary route guidance information to the vehicular route guidance apparatus and then transmitting the remaining route guidance information to the vehicular route guidance apparatus.

According to this aspect of the invention, if the end of a route segment for which route guidance information is to be transmitted exists on a toll road (or expressway), the information delivery center generates preliminary route guidance information for travel from that end to an escape location ahead, and transmits the route guidance information and the preliminary route guidance information together to the vehicular route guidance apparatus. This operation can prevent the previously described improper route guidance.

According to still another aspect of the invention, a vehicular route guidance apparatus is provided which receives, from an information delivery center, a series of transmissions separated in time, each transmission containing a packet of route guidance information corresponding to a segment of prescribed road length of the recommended route and provides route guidance to the destination using that route guidance information responsive to each such transmission. The vehicular route guidance apparatus includes route guidance information storing means for receiving, from the information delivery center, preliminary route guidance information, generated if the end of the segment of the recommended route covered by the preceding route guidance information is on an expressway or toll road, route guidance information corresponding to a prescribed road length, the preliminary route extending from that end to an escape position ahead on the expressway or toll road. Each such transmission further includes remaining route guidance information for a remaining route which is a segment of the recommended route having the prescribed road length minus the preliminary route. The vehicular route guidance apparatus receives and stores both the route guidance information and the preliminary route guidance information of each completed transmission. The vehicular route guidance apparatus further includes route guidance means for executing route guidance for a recommended route segment, when communication with the information delivery center is disrupted, from the end of the segment which was the subject of the last complete transmission to an escape position on the expressway or toll road, using only the received preliminary route guidance information.

According to this aspect of the invention, the vehicular route guidance apparatus receives route guidance information for a route segment corresponding to a predetermined or set length of the recommended route and preliminary route guidance information to be used when the end of the route segment corresponding to the predetermined or set road length falls on a toll road (or expressway), for guidance from that end to an escape position ahead on the expressway or toll road. The received route guidance information and preliminary route guidance information are stored in the route guidance information storing means and the route guidance means performs route guidance based thereon. This can prevent improper route guidance where the vehicle present position would be displayed without that part of the expressway or toll road ahead of the afore-mentioned end, when communication with the information center has been broken.

As used hereinafter "prescribed road length" is intended to include both a length set by the operator and a predetermined length.

According to a further aspect of the invention, a route guidance system is provided which comprises an information delivery center for transmitting, to a vehicular route guidance apparatus, route guidance information for route guidance to a destination, the information delivery center including search means for searching for a recommended route to the destination; and transmitting means for transmitting, to the vehicular route guidance apparatus, route guidance information for guidance along the recommended route. The vehicular route guidance apparatus provides route guidance based on the route guidance information transmitted from the information delivery center, and includes road data storing means in which road data is stored and re-search means for searching for a route again, using the stored road data, when communication with the information delivery center is unavailable and the vehicle has exited an expressway or toll road and entered onto an ordinary road.

According to this aspect of the invention, in the case where the vehicle is on an expressway when normal communication with the information delivery center is broken and the expressway is a new expressway for which road data is not stored in the road data storing means, the re-search means of the vehicular route guidance apparatus does not perform a route search, using the road data contained in the road data storing means, unless the vehicle first exits the expressway. Therefore, improper route guidance is not performed by substitution of another road, for which data is are stored in the road data storage means, for the new expressway.

In yet another aspect the present invention provides a method for communication of guidance information between a central information center and plural vehicles each of which is equipped with a vehicular navigation apparatus. This includes:

transmitting from the vehicular navigation apparatus to the central information center information identifying a present position of a vehicle and a destination;

searching within the central information center, to determine a recommended route from the present vehicle position to the destination;

generating guidance information for the recommended route within the central information center;

transmitting the generated guidance information, as a series of transmissions, to the vehicular navigation apparatus, each of said transmissions providing guidance information for a segment of the recommended route having a prescribed length, each of said transmissions including a first portion of guidance information of short duration to be utilized for guidance in the event of a failure in communication between the central information center and the vehicular navigation apparatus and a second portion providing more detailed guidance information for the route segment and having a duration significantly longer than that of said first portion.

DESCRIPTION OF THE PREFERRED EMBODIMENTS

Embodiments of the present invention will be hereinafter described in detail with reference to the accompanying drawings.

Embodiment 1

Figure 1:
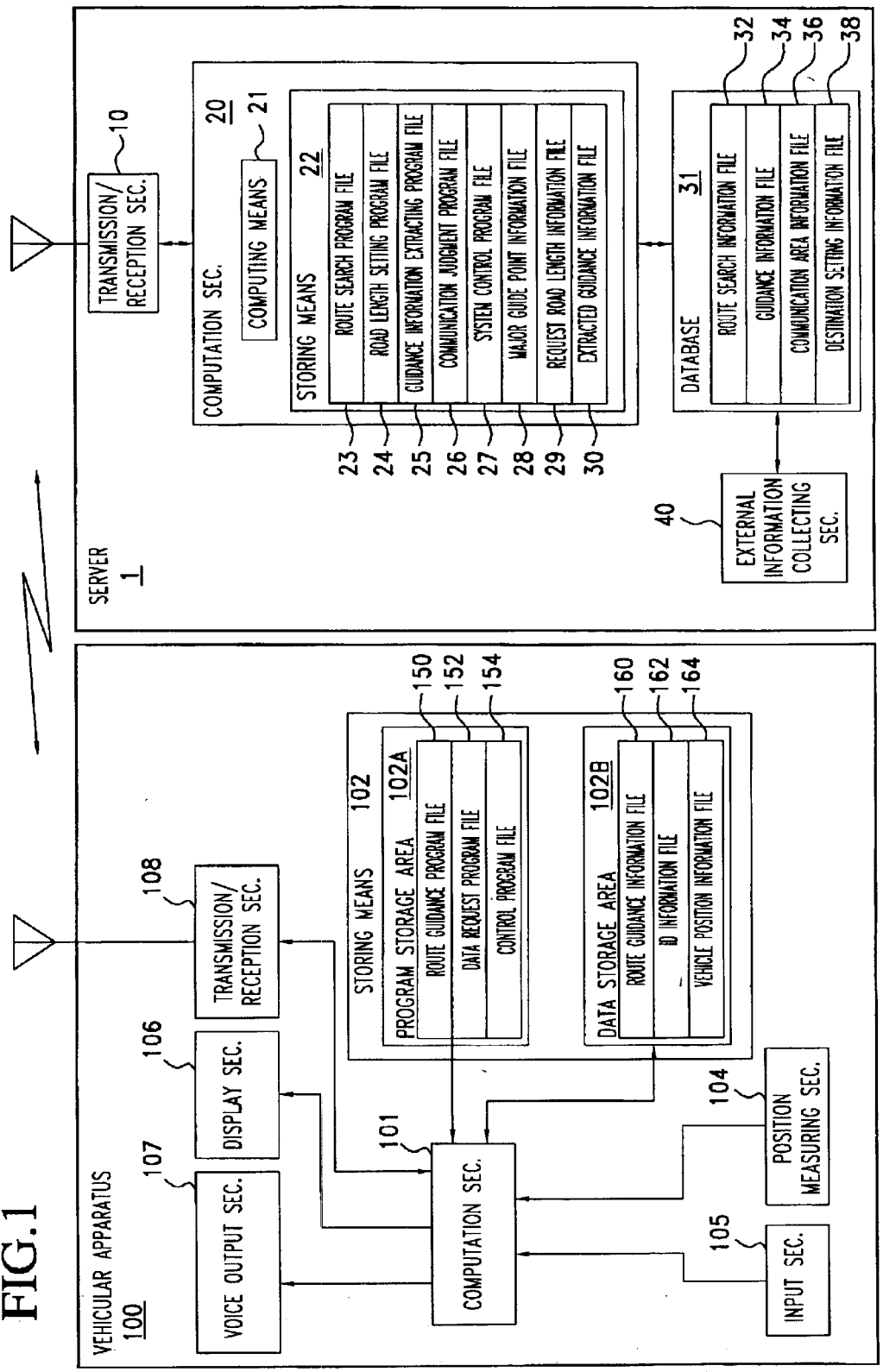
FIG. 1 is a block diagram of a communication-type route guidance system according to a first embodiment of the present invention.

As shown in FIG. 1, a first embodiment of the navigation system of the invention includes a server 1 as an information center and a vehicular apparatus 100 as a mobile navigation apparatus. Although there actually exist a plurality of such vehicular apparatuses 100, for convenience of description, in this embodiment they are represented by the single vehicular apparatus 100.

The Server

The server 1 is a computer having a transmission/reception section 10, a computation section 20, a database 31, and an external information collecting section 40. The server 1 may be a single-apparatus server, a divided server in which a plurality of apparatuses are combined together organically to function as a single server, as in a large server or computer.

Equipped with a communication device including a transmitter and a receiver, the transmission/reception section 10 communicates with the vehicular apparatus 100 over a network. The network may be a wired or wireless public communications network, a dedicated communication network, the Internet, an intranet, a LAN (local area network), a WAN (wide area network), a satellite communication network, a vehicular telephone network, a cellular phone network, a PHS (personal handy-phone system) network, or a combination thereof. Communication may be by satellite broadcast such as CS broadcast or BS broadcast, ground-wave digital TV broadcast, or FM multiplex broadcast. Communication may also be by optical beacons or radio beacons which are installed alongside roads and which transmit traffic congestion information, regulation-of-traffic information, etc.

The computation section 20 is equipped with a computing means 21 such as a CPU or a MPU and a storing means 22 such as a semiconductor memory or a magnetic disk. The storing means 22 contains files of various programs to be executed in the server 1. The files include a route search program file 23 that contains a program for searching for a route from a vehicle present position (e.g., a navigation start position or a departure place) to a destination (i.e., a navigation end position), a road length setting program file 24 that contains a program for setting a road length indicating a range of guidance information to be transmitted to the vehicle, a guidance information extracting program file 25 that contains a program for retrieving guidance information corresponding to the road length that has been set by the road length setting program and for editing the retrieved guidance information, a communication judgment program file 26 that contains a program for judging whether it is proper to transmit data, and a system control program file 27 that contains a program for controlling and managing the entirety of the various operations. The storing means 22 also contains a request road length information file 29 for storing information relating to a route-search-requested road length, an extracted guidance information file 30 for storing extracted route guidance information, and a major guide point information file 28 for storing information for major guide points. Further, a working area to be used in executing any of the above programs is included in the storing means 22. Configured as described above, the computation section 20 functions as a route search section as well as an information generation section for generating major guide point information and guidance information for a recommended route found by the search.

The database 31 contains files of information that are necessary for a route search and for route guidance. The files include a route search information file 32 that contains road network data etc., to be used in searching for a route to a destination, a guidance information file 34 in which route guidance information is accumulated, a communication area information file 36 in which information relating to communication areas is accumulated, and a destination setting information file 38 that contains such information as telephone numbers and addresses for selection in setting a destination and locations corresponding to those telephone numbers and addresses.

The route search information file 32 contains road network information including information relating to intersections and information relating to nodes. The guidance information file 34 contains various items of guidance information such as map information covering intersections and roads, landmark information indicating major facilities, and voice guidance information.

The communication area information file 36 contains information relating to communication states such as data to be used for determining areas which radio waves cannot reach (non-communication areas), areas not suitable for communication which only weak radio waves reach (communication-defective areas), and like areas. Thus, communication areas can be determined by using this information.

The external information collecting section 40 is connected to the database 31. The external information collecting section 40 is a section for updating the information stored in the database 31, as necessary, using telephone lines or the like, latest road/traffic information and communication information such as traffic congestion information, traffic accident information, road construction information, regulation-of-traffic information, information indicating a newly established road or facility, and changes in communication state of a given area, e.g., change from a non-communication area to a communication-defective areas. Each item of traffic congestion information, traffic accident information, road construction information, regulation-of-traffic information, and information indicating a newly established road or facility is collected in the form of a location and a date and time of occurrence and other information. For example, for traffic congestion information, a location and a date and time of occurrence of a traffic jam and other information are collected. The other types of information, such as traffic accident information, are collected in similar manner.

The Vehicular Apparatus 100

The vehicular apparatus 100 includes a computing means such as a CPU or an MAU, a storing means such as a semiconductor memory or a magnetic disk, a display means such as a liquid crystal display, an LED display, or a CRT display, an input means such as a keyboard, a remote controller, or a touch panel, a communication interface, etc. The vehicular apparatus 100 may be a cellular phone, a portable information terminal, a PDA (personal digital assistant), a personal computer, a video game machine, a digital TV receiver, or any other apparatus of this kind. In the preferred embodiment illustrated in FIG. 1 the vehicular apparatus 100 is a navigation apparatus provided in a vehicle such as an automobile, a truck, a bus, or a motorcycle, and includes a computation section 101, a storing means 102, a position determination section 104 serving as a present position determination (judging) section, an input section 105 also serving as a destination setting section, a display section 106 and a voice output section 107 serving as guidance output sections, and a transmission/reception section 108.

Equipped with a communication device including a transmitter and a receiver, the transmission/reception section 108 communicates with the server 1 over the network. The computation section 101 has a computing means such as a CPU or an MAU. The storing means 102 has a semiconductor memory, a magnetic disk, or the like, and a program storage area 102A and a data storage area 102B are contained in the storing means 102.

The program storage area 102A has a route guidance program file 150 that contains a program for displaying a route and landmarks on the display section 106 and for outputting voice route guidance from the voice output section 107 based on route guidance information that is transmitted from the server 1. The program storage area 102A also contains a data request program file 152 that, in turn, contains a program for comparing a vehicle present position with received route guidance information and requesting next route information and guidance information, and a control program file 154 that contains a program for controlling the overall operation.

The data storage area 102B functions as a working area that is used as necessary in executing a program. Further, for example, the data storage area 102B contains a route guidance information file 160 for storing route guidance information that is transmitted from the server 1, an ID information file 162 that contains a unique ID assigned to the associated vehicular apparatus 100 for its identification, a vehicle position information file 164 for storing vehicle position information (a longitude and a latitude) that is obtained by the position determination section 104, and other files. The data storage area 102B may also store map information that is downloaded from the server 1 or some other apparatus.

The vehicle position information file 164 stores, in addition to present position data that is repeatedly obtained by the position determination section 104 at a predetermined time interval, data of a plurality of past positions. For example, the vehicle position information file 164 stores items of position information for points on a route of a predetermined distance that has been covered by the vehicle or items of position information for a predetermined number of points on a route that has been covered by the vehicle. When a new present position has been located by the position determination section 104, the resulting latest position information thus gathered is stored in the vehicle position information file 164 and the oldest position information is erased from it. A running locus of the vehicle can be obtained by connecting the positions represented by items of position information stored in the vehicle position information file 164. The running locus is used for map matching to identify the road on which the vehicle is running.

The position determination section 104 is a section that determines a vehicle position using the GPS (global positioning system) etc., and is equipped with a GPS receiver for determination of a vehicle absolute position from signals received from a plurality of GPS satellites and is further equipped with a speed sensor, a direction sensor, etc., for determination of a vehicle relative position. The speed sensor and the direction sensor may be used for independent navigation. A relative position that is determined based on signals from these sensors is used for determining a vehicle position in a tunnel, for example, where the GPS receiver cannot receive radio waves from GPS satellites or correct for a measurement error in an absolute position that is measured by the GPS receiver. Where the vehicular apparatus 100 is a cellular phone, a portable information terminal, or the like, the position of a base station that covers a range where that vehicular apparatus is located is detected as a present position through communication with the base station.

The input section 105 includes various switches, a touch panel that is attached to the display screen of the display section 106, a remote controller, a speech recognition data input device, etc. When the user touches the touch panel with his finger at an icon or the like displayed on the display section 106, a corresponding instruction or item of information is input. The speech recognition data input device recognizes the voice of the operator, whereby a corresponding instruction or data is input.

The display section 106 is a liquid crystal display, a CRT display, or the like. It is desirable that the display section 106 be equipped with the above-mentioned touch panel.

The transmission/reception section 108 communicates with the server 1 over the network.

The vehicular apparatus 100 preferably is equipped with a route search program, route search information, guidance information, destination setting information, etc. and has the ability to, for example, perform a route search and generate guidance information without communicating with the server 1. If this is the case, the operator can choose either the server 1 or the vehicular apparatus 100 as the apparatus that to perform part or all of such operations as destination setting, route searching, and generation of guidance information.

Next, operations of the communication-type route guidance system having the above configuration will be described with reference to FIGS. 2 and 3.

First, the operator, e.g., driver of the vehicle, sets a destination and inputs an instruction to search for a route to the destination by use of the input section 105 of the vehicular apparatus 100. In response, as indicated by symbol F1 in FIG. 2, the vehicular apparatus 100 transmits, to the server 1, information such as a vehicle present position, as located by the position determination section 104, and the destination, as well as a request for performing a route search and sending back search results and guidance information. At the same time, the vehicular apparatus 100 transmits ID information to be used for distinguishing the vehicular apparatus 100 from others. The communication between the vehicular apparatus 100 and the server 1 is packet communication, for example.

In the server 1, the request from the vehicular apparatus 100 is received by the transmission/reception section 12 and supplied to the computation section 20. In the computation section 20, the request is received and the computing means 21 performs a route search by executing the route search program that is stored in the storing means 22. More specifically, first, as indicated by symbol F2 in FIG. 2, a vehicle present position and a destination are extracted based on the received information. For example, if such information as a telephone number or an address is received as the destination information, a destination is extracted by using the destination setting information file 38 that is stored in the database 31.

Then, information relating to a road length that is included in the received information is stored into the request road length information file 29 and a route from the vehicle present position to the destination is searched for. The road length may be properly set in the server 1. The route search is performed by referring to the route search information that is stored in the database 31, that is, the intersection information, the road information, and the node information. The route search operation itself is a known technique. A recommended route is set in accordance with prescribed conditions such as an instruction that the route whose entire length is shortest be made the optimum ("designated" or "recommended") route (refer to Japanese Patent Laid-Open Nos. 173297/1989 and 173298/1989).

In this embodiment, a route from a vehicle present position to the destination is searched for each time a request is received from the vehicular apparatus 100. In the server 1, the external information collecting section 40 acquires road information and traffic information from external sources and the contents of the database 31 are updated to include the latest information. Therefore, by performing a route search every time a request is received from the vehicular apparatus 100, traffic jam locations, road construction locations, accident locations, and the like can be avoided and hence a recommended route that reflects the latest data and corresponding guidance data can always be supplied to the vehicular apparatus 100.

Then, guidance information that is associated with a range corresponding to the road length is retrieved by referring to the guidance information file 34 of the database 31 by executing the guidance information extracting program that is stored in the storing means 22. As indicated by symbol F3 in FIG. 2, the route information and the guidance information are transmitted to the vehicular apparatus 100 by the transmission/reception section 10.

Figure 2:
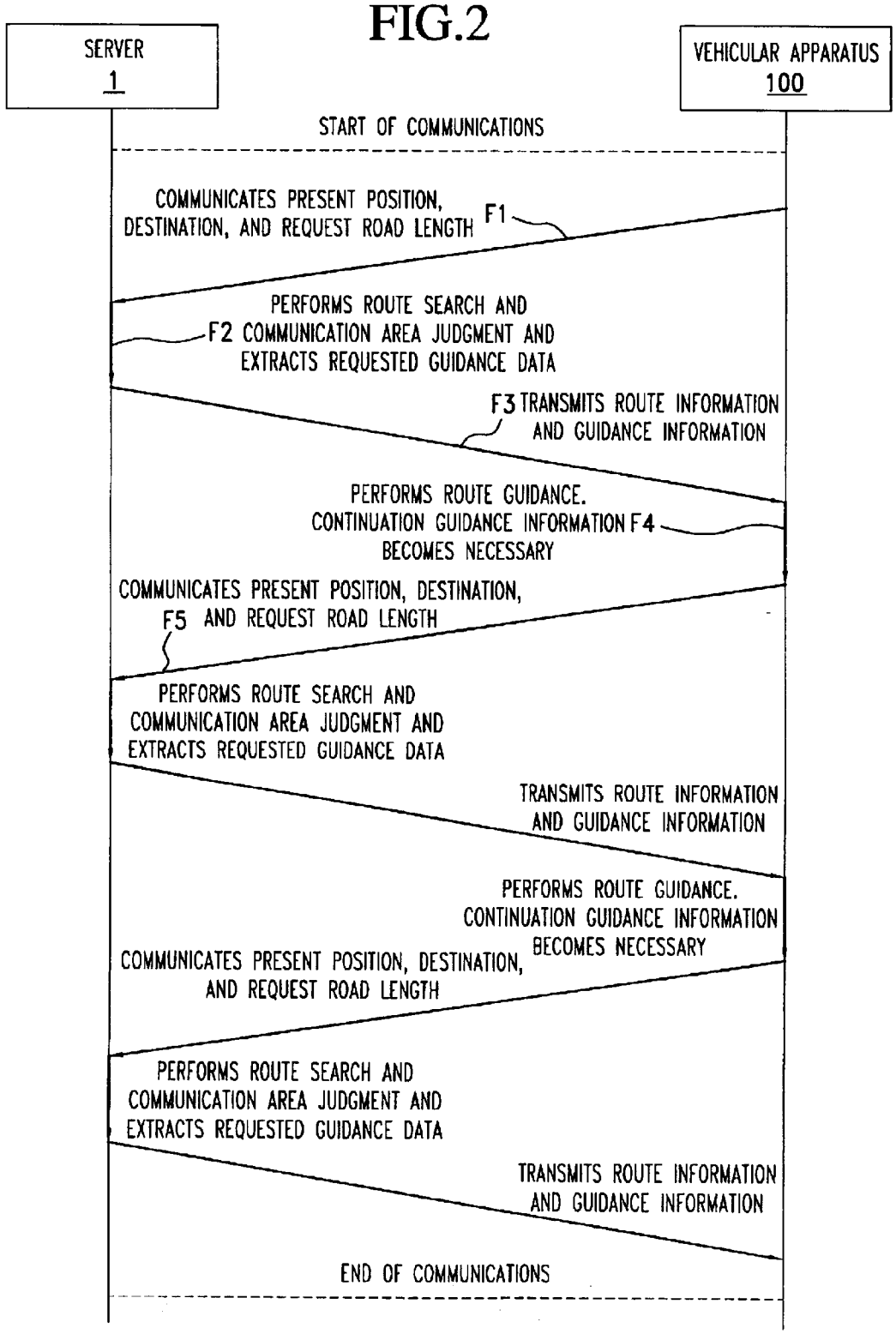
FIG. 2 is a time chart of operations of an information center and a vehicular apparatus of the route guidance system of FIG. 1.
Figure 3:
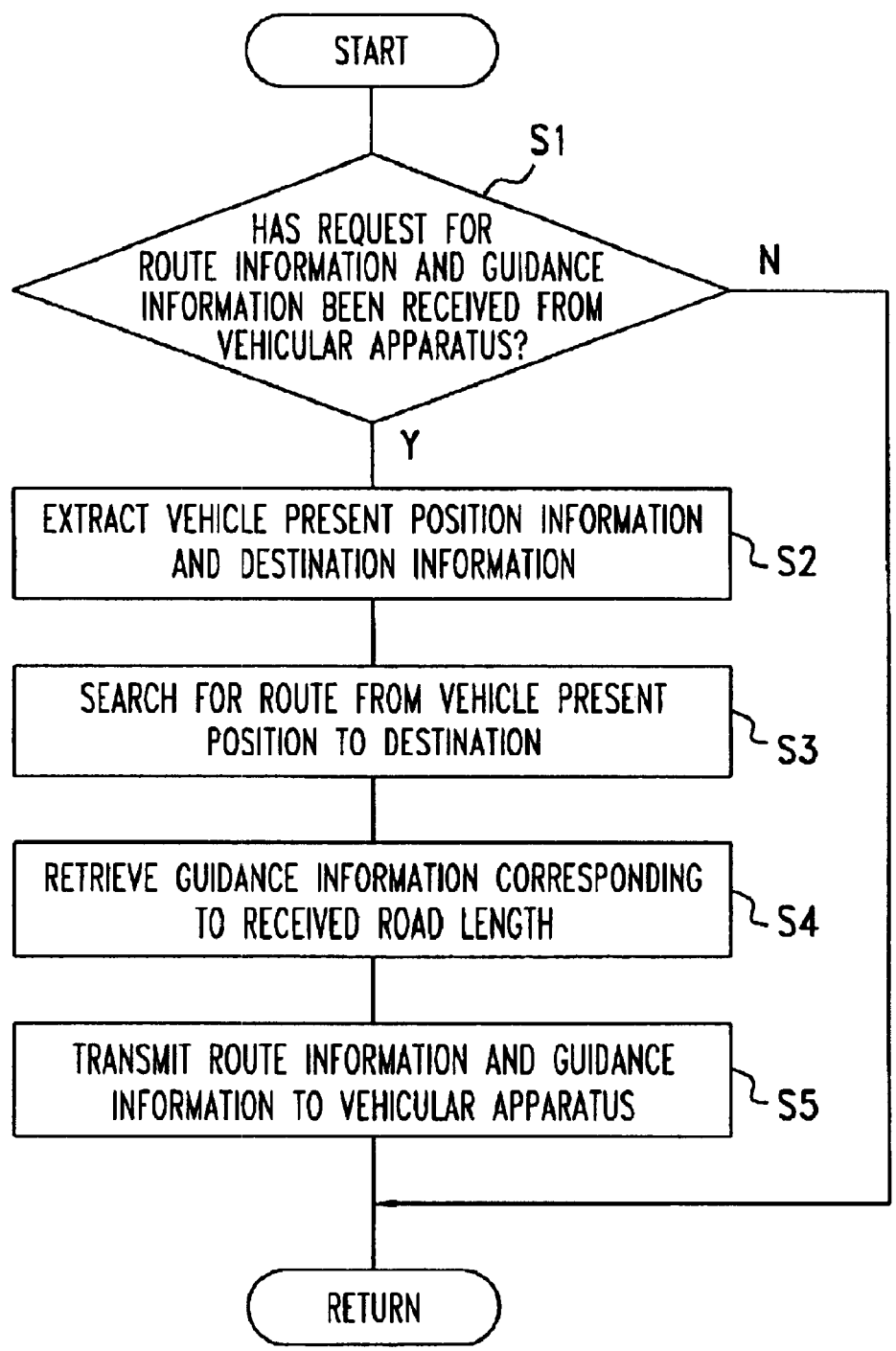
FIG. 3 is a flowchart of a routine executed in operation of the information center of the route guidance system of FIG. 1.
Figure 4:
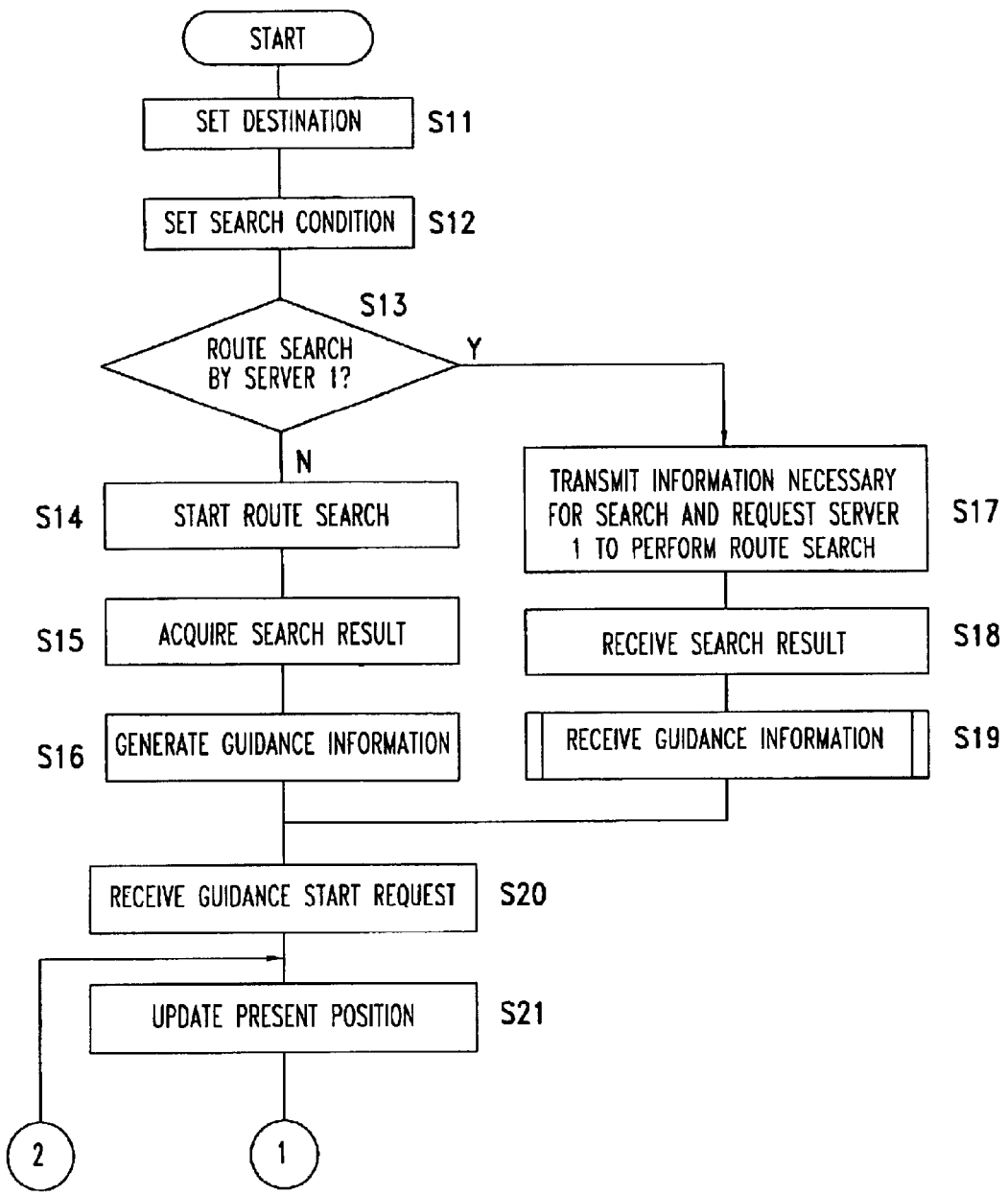
FIGS. 4–8 are first to fifth flowcharts showing routines for operation of the vehicular apparatus of the guidance system of FIG. 1.
Figure 5:
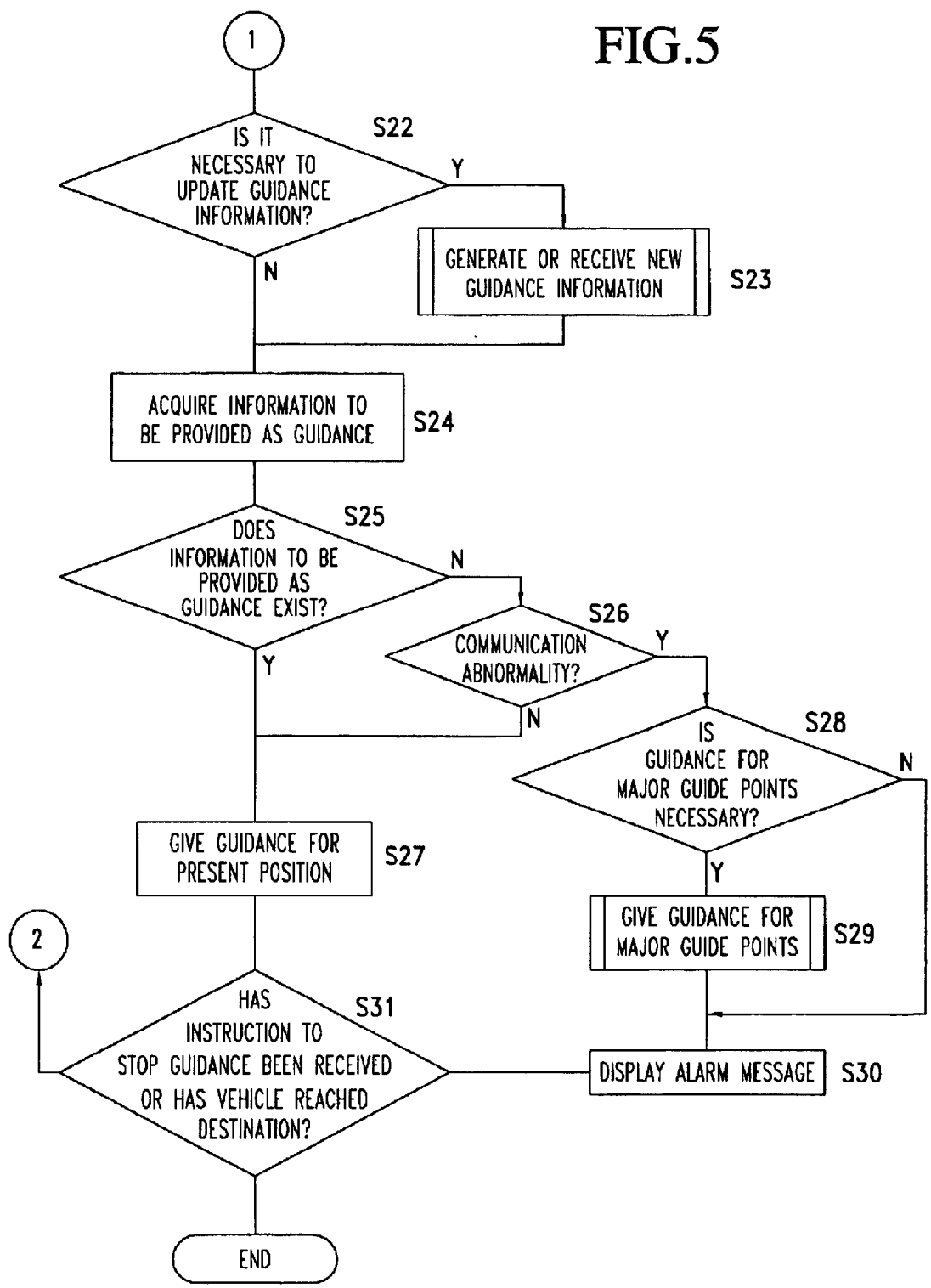
Figure 6:
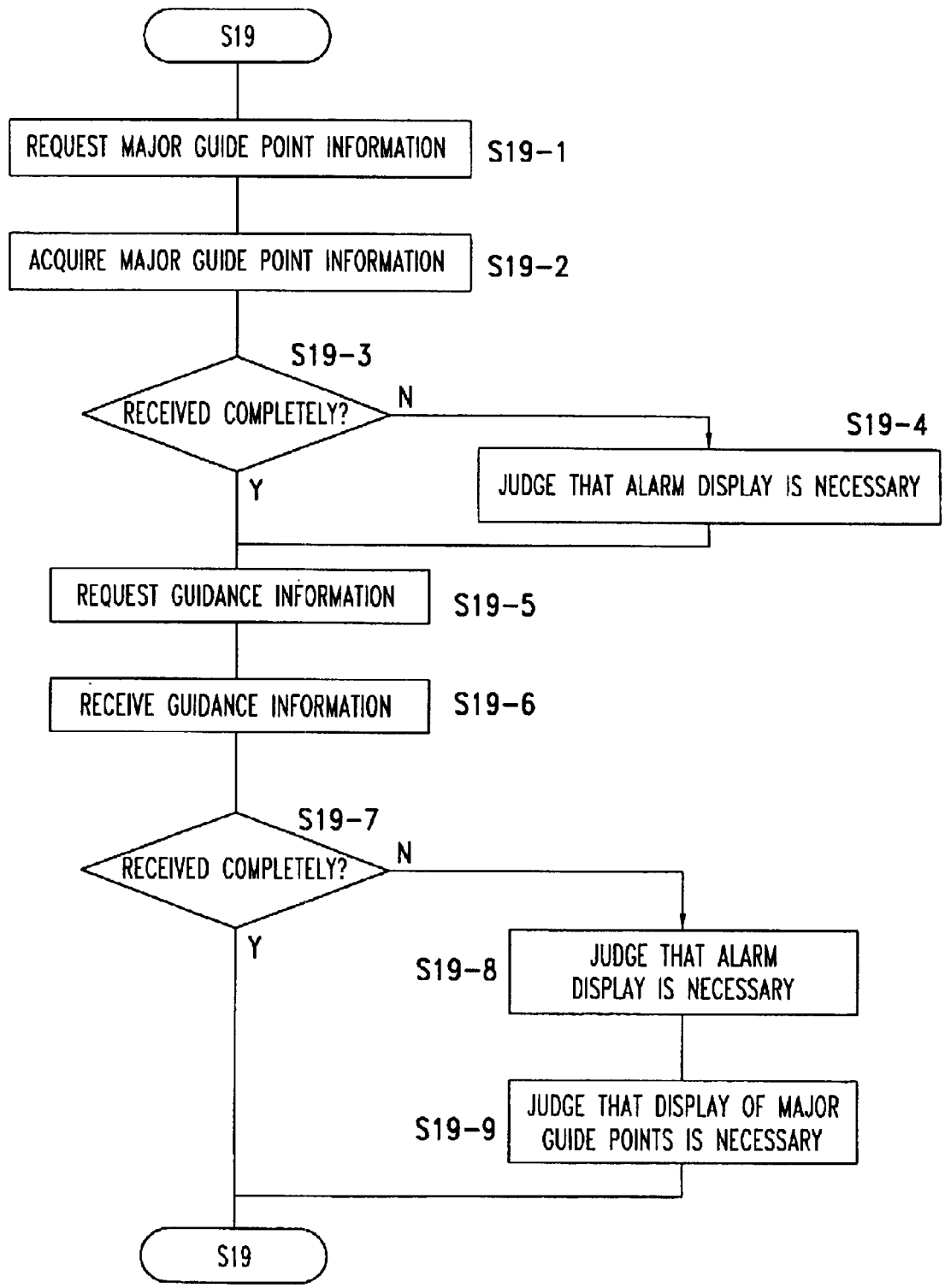
Figure 7:
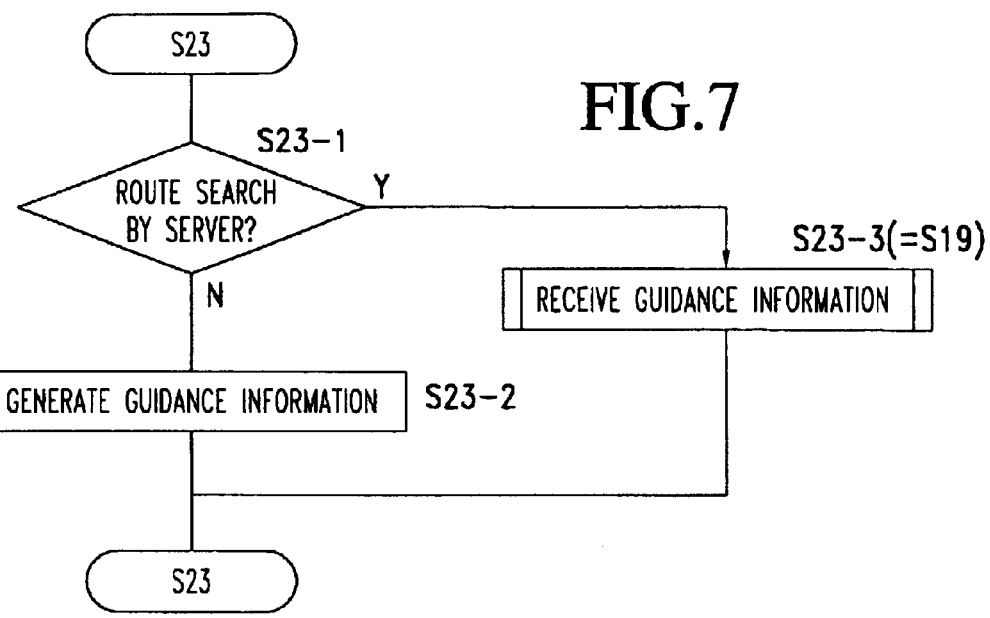
Figure 8:
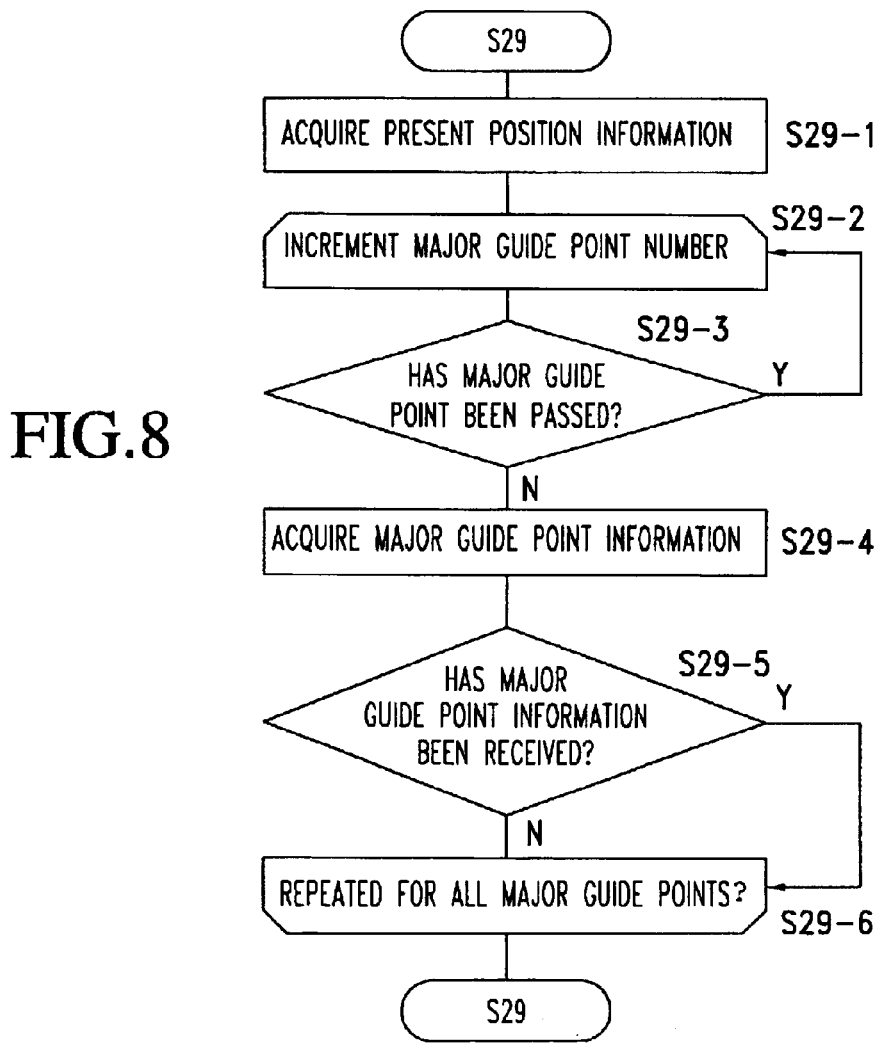

Next, as indicated by symbol F4 in FIG. 2, the vehicular apparatus 100 provides guidance for a length of the route corresponding to the set road length as display on the display section 106 and/or voice output from the voice output section 107. When the vehicle has covered a distance corresponding to the set road length and guidance information for continued guidance for the route ahead (i.e., "continuation route guidance information") has become necessary, the vehicular apparatus 100 again transmits, to the server 1, information such as a vehicle present position and the destination as well as a request for performing a route search and sending back search results and guidance information based on the search results, as indicated by symbol F5 in FIG. 2.

In response, the server 1 repeats the above-described operations and transmits route information and guidance information corresponding to an additional ("continuation") road length to the vehicular apparatus 100. From this time onward, the above-described operations are repeated as shown in FIG. 2 until the vehicle reaches the destination or the operator inputs, to the input section 105, an instruction to stop the navigation.

The server 1 may continue to store a route that was found in response to a first request from the vehicular apparatus 100 and transmit guidance information that is extracted based on the stored route when continuation route guidance information becomes necessary. This decreases the number of route searches and hence reduces the load on the server 1. Since guidance information is transmitted in divisions ("segments") of the recommended route, each division having the set road length, the time required for one communication is shortened. If it is judged, based on a received present position, that the vehicle has departed from the recommended route, the server 1 again performs a route search to find a new route.

Next, the operation of the server 1 will be described with reference to the flowchart of FIG. 3.

Step S1: the server 1 waits until a request for route information and guidance information is received from the vehicular apparatus 100. If a request is received, the routine goes to step S2.

Step S2: The server 1 extracts vehicle present position information and destination information.

Step S3: The server 1 searches for a route from the present position to the destination.

Step S4: The server 1 retrieves guidance information corresponding to a prescribed (e.g., "set") road length.

Step S5: The server 1 transmits route information and guidance information to the vehicular apparatus 100.

Next, the operation performed by the vehicular apparatus 100 when it cannot receive guidance information from the server 1, because of an abnormal break in communication between the server 1 and the vehicular apparatus 100, will be described with reference to FIGS. 4–8.

First, the operator, e.g., the driver of the vehicle, sets a destination and inputs an instruction to search for a route to the destination by use of the input section 105 of the vehicular apparatus 100. It is desirable that the operator be able to set conditions for the search. For example, the operator may specify that expressways should account for as large a part of the route as possible, that ordinary roads should account for as large a part of the route as possible, that the route should require the minimum expense possible, or that city roads should account for as small a portion of the route as possible.

Then, by use of the input section 105, the operator makes a selection which determines whether the vehicular apparatus 100 performs the route search or the server 1 performs the route search. For example, where the route search by the server 1 or the communication between the server 1 and the vehicular apparatus 100 requires payment of a fee, the operator may elect to have the route search conducted by the vehicular apparatus 100 if he wants to save the expense. Where the server 1 has the latest map information, road network information, etc., while the vehicular apparatus 100 does not, the operator may select a route search by the server 1 if he wants to receive a result and guidance information based on the latest information. Where the vehicular apparatus 100 does not have a route search function, the operator cannot have the vehicular apparatus 100 perform a route search and hence he can only have a route search conducted by the server 1.

The vehicular apparatus 100 need not always have map information, guidance information, and destination information. Where the vehicular apparatus 100 does not have such information, the operator cannot cause the vehicular apparatus 100 to perform a route search and hence he selects a route search by the server 1.

If the operator has selected a route search by the vehicular apparatus 100, the vehicular apparatus 100 starts a search and the position determination section 104 locates the vehicle present position. Then, a route from the present position to the set destination is searched for and the result is stored in the storing means 102. Then, guidance information for the route thus found, for example, information relating to a right or left turn at an intersection, a lane change before a branching point, or entrance into an interchange of an expressway, is generated and stored in the storing means 102.

If the operator has selected the server 1 to conduct the route search, the vehicular apparatus 100 transmits, to the server, information necessary for a search such as a vehicle present position and a destination, ID information, information relating to a road length, and other information, as well as a request for performing a route search and sending back the results and guidance information for guidance along the route found. In response, as described above, the server 1 performs a route search and sends back the route found (i.e., "recommended route") to the vehicular apparatus 100.

Further, the server 1 extracts guidance information for the route found and transmits the extracted information to the vehicular apparatus 100. This is done in the following manner. First, the vehicular apparatus 100 transmits, to the server 1, a request for sending back information for major guide points. The major guide point information is information relating to major guide points on the recommended route. Where the route includes an expressway or a toll road, examples of the major guide points are entrances to the expressway or toll road, in the form of interchanges and junctions, service areas, parking areas and exits in the form of interchanges and junctions. Where the route includes a road such as a bypass or a bridge that the vehicle cannot enter or exit, examples of the major guide points are intersections at the entrance and the exit of the road.

Receiving the request for sending back major guide point information, the server 1 extracts major guide point information and transmits it to the vehicular apparatus 100. In this manner, the vehicular apparatus 100 can acquire the major guide point information. Each piece of major guide point information includes, for example, coordinates, name, attribute (interchange, junction, service area, parking area, intersection, passage point, destination, or the like), road name, road type (intercity expressway, city expressway, toll road, ordinary road, or the like), image data, voice data, area information, and facility name.

At this stage, the vehicular apparatus 100 judges whether it has succeeded in receiving all the major guide point information. If the vehicular apparatus 100 judges that it has not received the major guide point information completely (because of some problem in communication—an "abnormal communication state"), the vehicular apparatus 100 recognizes that display of an alarm is needed. For example, an abnormal communication state occurs when the vehicle is running in a non-communication area or a communication-defective area, when the state of the ionosphere is unstable, and when one of the systems in the network is down.

Next, the vehicular apparatus 100 transmits a guidance information request to the server 1. Receiving the guidance information request, the server 1 retrieves guidance information corresponding to the set road length and transmits it to the vehicular apparatus 100. In this manner, the vehicular apparatus 100 can acquire the guidance information corresponding to the road length and store it in the storing means 102.

If the guidance information includes all or part of the major guide point information, the server 1 may delete that portion of the major guide point information that has already been transmitted to the vehicular apparatus 100 from the guidance information to be next transmitted. In this manner, the amount of information to be transmitted can be reduced and the time required for transmission can be shortened.

The system may be so configured that the server 1 transmits major guide point information and guidance information to the vehicular apparatus 100. In this case, the server 1 automatically transmits major guide point information and guidance information to the vehicular apparatus 100 upon receiving a present position, a destination, etc. from the vehicular apparatus 100.

At this stage, the vehicular apparatus 100 judges whether it has succeeded in receiving the complete guidance information. If the vehicular apparatus 100 judges that it has not received the guidance information completely because of a some abnormal state of communication, the vehicular apparatus 100 recognizes that an alarm display is needed and that guidance for the major guide points needs to be generated.

When the vehicular apparatus 100 has generated or received the guidance information and has stored it in the storing means 102, the operator inputs an instruction to start guidance, that is, requests a start of guidance, by use of the input section 105. In response, the position determination section 104 updates the location of the vehicle present position. Based on the updated present position, the vehicular apparatus 100 judges whether to update the guidance information that is stored in the storing means 102. The guidance information is updated when the vehicle has covered a distance corresponding to the set road length after the previously generated or received guidance information was stored in the storing means 102 and new guidance information for guidance for a route ahead (i.e., continuation guidance information) has become necessary.

If judged that the guidance information need not be updated, the vehicular apparatus 100 acquires, as information to be provided as guidance, the previously generated or received guidance information that is stored in the storing means 102.

On the other hand, if judged that the guidance information needs to be updated, the vehicular apparatus 100 generates or receives new guidance information. More specifically, the vehicular apparatus 100 judges whether the route search was performed by the vehicular apparatus 100 or by the server 1. If the route search was performed by the vehicular apparatus 100, the vehicular apparatus 100 generates new guidance information in the same manner as described above. If the route search was performed by the server 1, the vehicular apparatus 100 receives new guidance information from the server 1 in the same manner as described above. The vehicular apparatus 100 stores the new guidance information in the storing means 102 and retrieves it as guidance.

Then, the vehicular apparatus 100 judges whether it has succeeded in acquiring information to be provided as guidance, that is, whether there exists information to be provided as guidance. If there exists information to be provided as guidance, the vehicular apparatus 100 outputs route guidance in the form of route display on the display section 106 and/or voice output from the output section 107.

On the other hand, if there exists no information to be provided as guidance, the vehicular apparatus 100 judges whether an abnormal state of communication exists. If an abnormal state of communication is judged, the vehicular apparatus 100 judges whether it is necessary to provide guidance for the major guide points.

If it is necessary to provide guidance for the major guide points, first, the vehicular apparatus 100 acquires the present position information. The vehicular apparatus 100 then judges whether the vehicle has passed the first major guide point. If the vehicle has not yet passed the first major guide point, the vehicular apparatus 100 acquires information relating to the first major guide point. A judgment that the vehicle has passed the first major guide point is made if the vehicle has entered and then exited a circular area that is centered on the first major guide point and has a prescribed radius (e.g., 300 m). If the vehicle has passed the first major guide point, it is then judged whether the vehicle has passed the second major guide point. After confirming that information relating to the first major guide point has been acquired, the vehicular apparatus 100 repeats the above operation for the second major guide point and so on, for the remaining major guide points. The vehicular apparatus 100 then displays, on the display section 106, the guidance information for the major guide points and an alarm message indicating a failure to receive guidance information from the server. Alternatively, the guidance information for the major guide points and the alarm message may be output from the voice output section 107. If no information relating to the major guide points can be acquired, a message to that effect is also displayed.

Assume a case that a route includes an expressway and first to third major guide points are an interchange at which to enter the expressway, a service area to be passed on the expressway, and an interchange at which to exit the expressway, respectively. If the vehicle is traveling on the expressway, that is, if the present position is on the expressway, the vehicular apparatus 100 judges that the vehicle has passed the entrance interchange and judges whether the vehicle has passed the service area without acquiring information relating to the entrance interchange. Then, if the vehicle has not passed the service area yet, the vehicular apparatus 100 acquires information relating to the service area as well as information relating to the interchange at which to exit the expressway. The vehicular apparatus 100 displays, on the display section 106, a message to the effect that route guidance cannot be performed due to an abnormal state of communication, and gives guidance to the effect that the vehicle should exit the expressway at the exit interchange after passing the service area.

After giving guidance for the present position or displaying the alarm message and giving guidance for the major guide points, the vehicular apparatus 100 judges whether an instruction to stop the guidance has been input or the vehicle has reached the destination. If an instruction to stop the guidance has been input or if the vehicle has reached the destination, the vehicular apparatus 100 finishes the route guidance operation. On the other hand, if an instruction to stop the guidance has not been input and the vehicle has not yet reached the destination, the vehicular apparatus 100, updates the present position and repeats the above-described operation.

The system may be so configured that the vehicular apparatus 100 gives guidance for the major guide points even if there is no problem in communication with the server. In this case, the operator can recognize the major guide points in advance and hence can reach the major guide points easily even if a problem with communication subsequently develops.

The system may be so configured that when the present position is on an expressway, a toll road, or an upper level of a multi-level road, the server 1 transmits information relating to an interchange at which to exit the expressway, toll road, or upper level of the multi-level road to the vehicular apparatus 100 as major guide point information. In this case, when a problem with communication ("abnormal communication state") has occurred during the vehicle's travel on an expressway, a toll road, or a high level of a multi-level road, the operator can easily recognize the interchange at which to exit the expressway, toll road, or upper level layer of the multi-level road.

Further, the system may be so configured that the server 1 transmits information relating to the interchange at which to exit the expressway, toll road, or upper level of the multi-level road to the vehicular apparatus 100 as major guide point information, irrespective of the present position, if the end of the section of the above-mentioned set road length is located on the expressway, toll road, or upper level of the multi-level road. In this case, even if the vehicle present position is on an ordinary road leading to the expressway, toll road, or upper level of the multi-level road and a problem with communication later develops, the operator will be able to easily recognize the interchange at which to exit the expressway, toll road, or upper level of the multi-level road.

Next, the routines of the flowcharts of FIGS. 4–8 will be described.

Step S11: The operator sets a destination by use of the input section 105 of the vehicular apparatus 100.

Step S12: The operator sets a search condition.

Step S13: The operator chooses between a route search by the server 1 and a route search by the vehicular apparatus 100. The process goes to step S17 if a route guidance by the server is selected, and to step S14 if a route guidance by the vehicular apparatus 100 is selected.

Step S14: The vehicular apparatus 100 starts a route search.

Step S15: The vehicular apparatus 100 acquires the search results.

Step S16: The vehicular apparatus 100 generates guidance information.

Step S17: The vehicular apparatus 100 transmits information necessary for a search and requests the server 1 to perform a route search.

Step S18: The vehicular apparatus 100 receives the search results.

Step S19: The vehicular apparatus 100 receives guidance information.

Step S19-1: The vehicular apparatus 100 transmits, to the server 1, a request for sending back major guide point information.

Step S19-2: The vehicular apparatus 100 acquires major guide point information.

Step S19-3: The vehicular apparatus 100 judges whether the vehicular apparatus 100 has successfully received all the major guide point information. The process goes to step S18-5 if the vehicular apparatus 100 has succeeded in doing so, and to step S19-4 if not.

Step 19-4: The vehicular apparatus 100 judges that an alarm display is necessary.

Step S19-5: The vehicular apparatus 100 transmits, to the server 1, a request for sending back guidance information.

Step S19-6: The vehicular apparatus 100 receives guidance information from the server 1.

Step S19-7: The vehicular apparatus 100 judges whether it has successfully received all the guidance information. If the vehicular apparatus 100 has not succeeded in doing so, the process goes to step S19-8.

Step S19-8: The vehicular apparatus 100 judges that an alarm display is necessary.

Step S19-9: The vehicular apparatus 100 judges that display of major guide points is necessary.

Step S20: The vehicular apparatus 100 receives a guidance start request.

Step S21: The vehicular apparatus 100 updates the present position.

Step S22: The vehicular apparatus 100 judges whether it is necessary to update the guidance information. The process goes to step S23 if it is necessary to do so, and goes to step S24 if not.

Step S23: The vehicular apparatus 100 generates or receives new guidance information.

Step S23-1: The vehicular apparatus 100 judges whether the route search was performed by the server 1. The process goes to step S23-3 if the route search was performed by the server 1, and goes to step S23-2 if not.

Step S23-2: The vehicular apparatus 100 generates new guidance information.

Step S23-3: The vehicular apparatus 100 receives new guidance information (as in step S19).

Step S24: The vehicular apparatus 100 acquires the guidance information that is stored in the storing means 102.

Step S25: The vehicular apparatus 100 judges whether there exists information to be provided as guidance. The process goes to step S27 if such information exists, and goes to step S26 if not.

Step S26: The vehicular apparatus 100 judges whether a state of abnormal communication state exists. The process goes to step S28 if there is an abnormal communication state, and goes to step S27 if not.

Step S27: The vehicular apparatus 100 gives guidance for the present position.

Step S28: The vehicular apparatus 100 judges whether guidance for the major guide points is necessary. The process goes to step S29 if guidance for the major guide points is necessary, and goes to step S30 if not.

Step S29: The vehicular apparatus 100 gives guidance for the major guide points.

Step S29-1: The vehicular apparatus 100 acquires present position information.

Step S29-2: The vehicular apparatus 100 increments the major guide points.

Step S29-3: The vehicular apparatus 100 judges whether the major guide point has been passed. The process returns to step S29-2 if the major guide point has been passed, and goes to step S29-4 if not.

Step S29-4: The vehicular apparatus 100 acquires major guide point information.

Step S29-5: The vehicular apparatus 100 judges whether the major guide point information has been received. The process goes to step S29-6 if the major guide point information has not been received.

Step S29-6: The process goes to the next step if steps S29-2 to S29-5 have been repeated for all the major guide points.

Step S30: The vehicular apparatus 100 displays an alarm message.

Step S31: The vehicular apparatus 100 judges whether it has received an instruction to stop the guidance or the vehicle has reached the destination. The process is finished if the vehicular apparatus 100 has received an instruction to stop the guidance or the vehicle has reached the destination. Otherwise, the process returns to step S21.

Steps S12, S14 to S16, S19-1, S19-3 to S19-5, S19-7 to S19-9, S20, S23-1 and S23-2, S25, S28, S29-1 to 29-6, S30, etc. may be omitted as necessary.

As described above, in this embodiment, the navigation system includes the server 1 and the vehicular apparatus 100. The server 1 performs a route search and the vehicular apparatus 100 can receive and output a search result and guidance information for the route found by the server 1. Further, the vehicular apparatus 100 can acquire major guide point information. Therefore, even when an abnormal state of communication prevents the vehicular apparatus 100 from receiving route guidance information from the server 1, the vehicular apparatus 100 can give guidance for major guide points and hence the operator can acquire a minimum amount of guidance for the route. Therefore, the vehicular apparatus 100 need not continue the route guidance using map information etc., which it has stored, and can avoid improper guidance.

Assume a case wherein communication between the server 1 and the vehicular apparatus 100 is disabled in the middle of a guidance for an optimum route that was found by a route search in the server 1 and includes a new expressway and wherein, as a result, the vehicular apparatus 100 can no longer acquire guidance information for the route ahead from the server 1. In this case, in the conventional navigation system previously described in the "BACKGROUND OF THE INVENTION" section, the vehicular apparatus attempts to display guidance information for the route ahead on a map, based on the previously received data of the optimum route, using the map information stored in the storage medium of the vehicular apparatus. However, if the map information stored in the storage medium of the vehicular apparatus has not been updated, it may not include the new expressway and hence the vehicular apparatus cannot display a route including the new expressway on the map. As a result, the vehicular apparatus continues the route guidance by displaying a route including an ordinary road in place of the new expressway on the map and the route guidance therefore becomes improper.

In contrast, in the navigation system according to the present invention, the vehicular apparatus 100 receives at the outset, as major guide point information, guidance information for an interchange at which to enter an expressway, a service area to be passed in travel on the expressway, and an interchange at which to exit the expressway. Therefore, even if communication between the server 1 and the vehicular apparatus 100 is disabled while the vehicle is running on the expressway and the vehicular apparatus 100 can no longer receive guidance information for the route ahead, the vehicular apparatus 100 can still give guidance for the major guide points and the operator can thereby acquire a minimum amount of guidance.

In the above example, since the present position is on an expressway, the vehicular apparatus 100 judges that the vehicle has passed the entrance interchange of the expressway that is the first major guide point. Accordingly, the vehicular apparatus 100 does not acquire information relating to the entrance interchange and proceeds to judge whether the vehicle has passed the service area which is the second major guide point. If the vehicle has not passed the service area yet, the vehicular apparatus 100 acquires information relating to the service area and then information for the interchange at which to exit the expressway as the third major guide point. The vehicular apparatus 100 gives guidance for the second and third major guide points. That is, a message to the effect that the vehicle should exit the expressway at the exit interchange, after passing the service area, is given to the operator in the form of display on the display section 106 or voice output from the voice output section 107.

In this manner, the operator can reach the destination utilizing reliable guidance, through a minimum amount of guidance, without becoming confused by improper route guidance.

The invention is not limited to the above-described embodiment. Various modifications are possible without departing from the spirit and scope of the invention.

As described above, according to the invention, even when communication between the information center and the vehicular apparatus is disabled, proper guidance can be provided in the form of guidance for major guide points.

Embodiment 2

A communication-type car navigation system according to a second embodiment of the invention will be described with reference to FIGS. 9–14.

Figure 9:
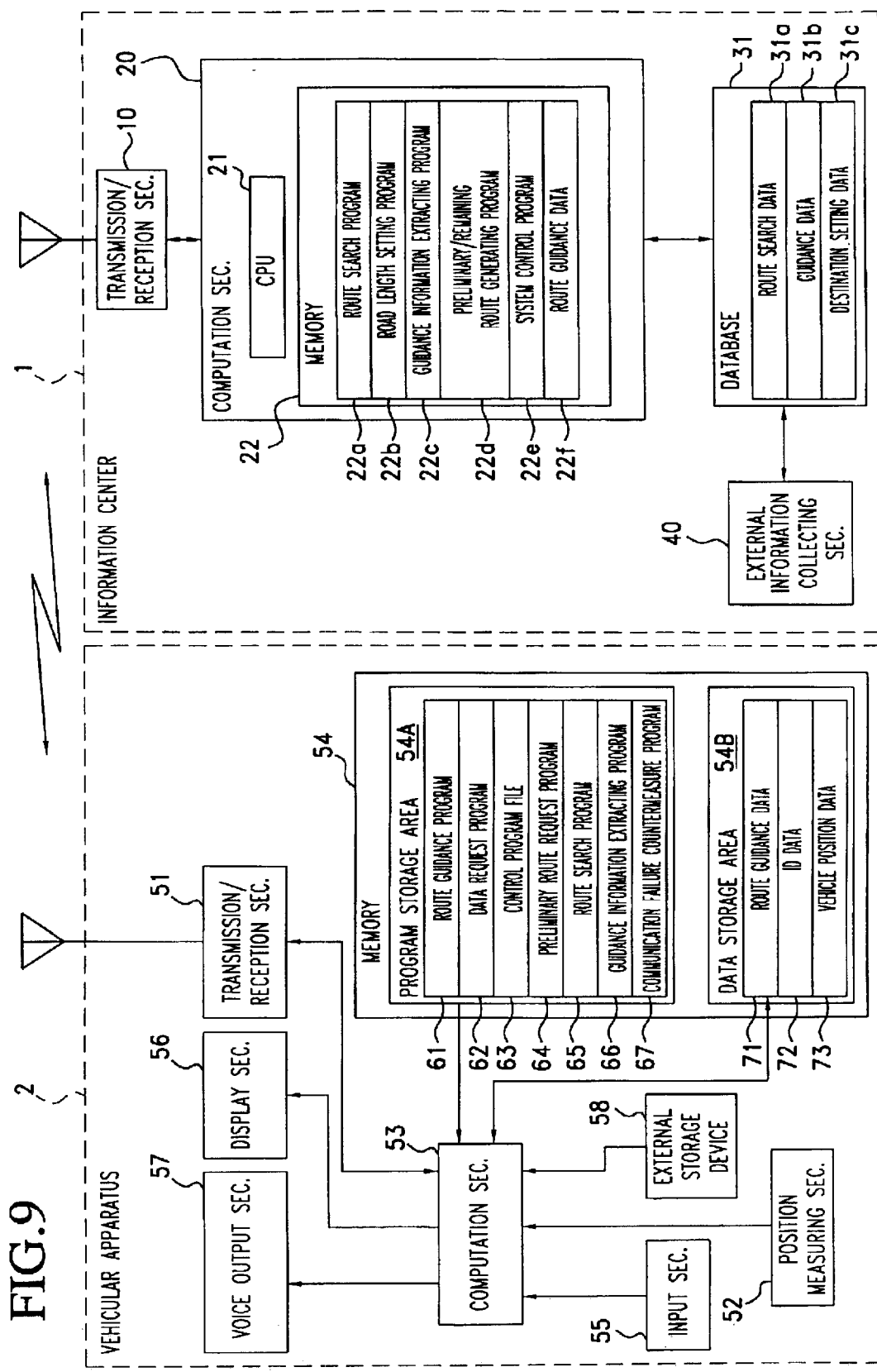
FIG. 9 is a block diagram of a navigation system according to a second embodiment of the invention.

FIG. 9 shows the configuration of the communication-type car navigation system according to the second embodiment. As shown in FIG. 9, the communication-type car navigation system includes an information delivery center (hereinafter referred to simply as "information center") 1 and a vehicular route guidance apparatus ("vehicular apparatus), i.e., a navigation apparatus provided in a car.

The information center 1 is equipped with a transmission/reception section 10, a computation section 20, a database 31, and an external information collecting section 40. In the form of a communication device including a transmitter and a receiver, the transmission/reception section 10 exchanges data with the vehicular apparatus 2. The transmission/reception section 10 can use a vehicular telephone, cellular phone, PHS, or like communication system.

The computation section 20 serves as a search means, a transmitting means, a preliminary route guidance information generating means, and a remaining route guidance information generating means, and is equipped with a central processing unit (CPU) 21 that performs computations and a memory 22 that stores various programs and data. The memory 22 contains various programs to be executed in the information center 1, such as a route search program 22a, a road length setting program 22b, a guidance information extracting program 22c, a preliminary/remaining route generating program 22d, and a system control program 22e. A working area to be used when any of those programs is executed is provided in the memory 22.

The route search program 22a is a program that is executed by the CPU 21 to search for a route from a vehicle present position (e.g., a navigation start location or a departure location) to a destination (i.e., a navigation end location).

The road length setting program 22b is a program that is executed by the CPU 21 to set a range for the guidance information to be transmitted to the vehicle, in response to each request, based on road length information that is transmitted from the vehicular apparatus 2. If the end of the range of previously generated route guidance information is located on an expressway, the road length setting program 22b sets, in response to a new request, a route guidance range corresponding to a route (preliminary route; much shorter than a transmission road length) to an interchange, a service area, or a parking area as an exit point, as well as a remaining route guidance range corresponding to a remaining route that is the set ("transmission") road length minus the road length of the preliminary route.

The guidance information extracting program 22c is a program that is executed by the CPU 21 to retrieve and edit route guidance information corresponding to a route guidance range that has been set by the road length setting program 22b.

Assume that the end of the range of the route guidance information which was generated in response to a preceding request and which corresponds to the set road length is located on a toll road. The preliminary/remaining route generating program 22d is a program that is executed by the CPU 21 to search for a route from that end to the closest interchange, service area, or parking area, ahead of that end, on the toll road (preliminary route search), to search for a remaining route whose road length is equal to the set road length minus the road length of the preliminary route (remaining route search), and to retrieve and edit guidance information for the preliminary route thus found (preliminary route guidance information) and guidance information for the remaining route thus found (remaining route guidance information). The system control program 22e is a program that is executed by the CPU 21 to control and manage the overall operation.

The database 31 contains data necessary for a route search and route guidance. The data include route search data 31a to be used for searching for a route to a destination, guidance data 31b as an accumulation of data for route guidance, destination setting data 31c in the form of telephone numbers and addresses to be set as a destination and positions corresponding to those telephone numbers and addresses. The route search data 31a is road network data including data relating to intersections, data relating to roads, and data relating to nodes. The guidance data 31b includes, for example, map data for intersections and roads, major landmark data, and voice guidance information.

The database 31 is connected to the external information collecting section 40. The external information collecting section 40 updates the data stored in the database 31 as necessary by collecting, using telephone lines or the like, the latest road/traffic information and communication information such as traffic congestion information, traffic accident information, road construction information, regulation-of-traffic information, information indicating a newly established road or facility, and information as to a change in non-communication areas and communication-defective areas. Each piece of traffic congestion information, traffic accident information, road construction information, regulation-of-traffic information, and information indicating a newly established road or facility is collected in the form of a location and a date and time of occurrence and other information. For example, for traffic congestion information, a location and a date and time of occurrence of a traffic jam and other information are collected. The other types of information such as traffic accident information are collected in similar fashion.

The vehicular apparatus 2 includes a transmission/reception section 51, a position determination section 52, a computation section 53 that serves as a route guidance means and a re-search means, a memory 54, an input section 55, a display section 56, a voice output section 57 in the form of a speaker, and an external storage device 58 which serves as a road data storing means.

As a communication device including a transmitter and a receiver, the transmission/reception section 51 exchanges data with the information center 1. Like the transmission/reception section 10 of the information center 1, the transmission/reception section 51 can use a vehicular telephone, cellular phone, PHS, or like communication system. The transmission/reception section 51 is also equipped with a receiver for receiving optical beacon information as route information that is transmitted from beacons which are provided along a road and which transmit, to vehicles, traffic congestion information, regulation-of-traffic information, etc., for a limited area in a system referred to as a VICS (vehicle information and communication system).

The position determination section 52 is a section for determining a vehicle position using the GPS etc., and is equipped with a GPS receiver for determining the a vehicle absolute position by receiving signals from a plurality of GPS satellites and with a combination of a speed sensor, a direction sensor, etc., for measuring a vehicle relative position. The speed sensor and the direction sensor are used for independent navigation. For example, a relative position that is determined by these sensors is used as the vehicle position in a tunnel or the like where the GPS receiver cannot receive radio signals from the GPS satellites or correct for an error in the absolute position that is determined by the GPS receiver.

The computation section 53, the main part of which is a CPU, performs various types of computations according to various programs stored in the memory 54.

The memory 54 has a program storage area 54a that contains a route guidance program 61, a data request program 62, a control program 63, a preliminary route request program 64, a route search program 65, a guidance information extracting program 66, a communication failure countermeasure program 67, etc. The route guidance program 61 is a program that is executed by the computation section 53 for display of a route and landmarks based on route guidance information that is transmitted from the information center 1 and for output of a route guidance voice from the voice output section 57. The data request program 62 is a program that is executed by the computation section 53 for comparing a vehicle present position with the received route guidance information and for requesting further route guidance information. The control program 63 is a program that is executed by the computation section 53 to control the overall operation of the vehicular apparatus 2.

The preliminary route request program 64 is a program that is executed by the computation section 53 for comparing a vehicle present position with the received route guidance information and for requesting route guidance information (preliminary route guidance information) for a route (preliminary route) to the next interchange, service area, or parking area.

The route search program 65 is a program that is executed by the computation section 53 to search for a route to a destination using the road network data for a route search which is stored in the external storage device 58 and which includes data relating to intersections, data relating to roads, and data relating to nodes when route guidance information (including preliminary route guidance information) cannot be received from the information center 1 by the communication failure countermeasure program 67.

The guidance information extracting program 66 is a program that is executed by the computation section 53 to retrieve and edit a route that has been found by the route search program 65.

The communication failure countermeasure program 67 is a program that is executed by the computation section 53 to perform various types of route guidance when communication with the information center 1 has been interrupted and route guidance cannot be performed using route guidance information transmitted from the information center 1.

The memory 54 also has a data storage area 54b as a route guidance information storing means. The data storage area 54b functions as a working area that is used as necessary in executing any of the above-mentioned various programs, and contains route guidance data 71 which includes route guidance information transmitted from the information center 1, ID data 72 that is unique to the associated vehicle, vehicle position data 73 that is obtained by the position determination means 52, and other data.

The route guidance data 71 includes, in addition to route guidance information, preliminary route guidance information that is also transmitted from the information center 1. The vehicle position data 73 includes, in addition to present position information that is repeatedly obtained by the position determination section 52 at a predetermined time interval, items of past position information. For example, the vehicle position data 73 includes items of position information for measurement points at predetermined distances or items of position information for a predetermined number of measurement points. When a new determination has been made by the position determination section 52, the thus obtained most recent position information is stored and the oldest position information is erased. A vehicle running locus can be obtained by connecting those items of position information. The vehicle running locus is used for map matching for determining the road on which the vehicle is currently travelling.

The input section 55 includes various switches, a touch panel that is attached to the display screen of the display section 56, a remote controller, a speech recognition data input device, etc. When the user touches the touch panel at an icon or the like that is displayed on the display section 56, a corresponding instruction or item of information is input. The speech recognition data input device recognizes the voice of the user, whereby a corresponding instruction or item of information is input.

The display section 56 is a liquid crystal display, a CRT display, or the like and is equipped with the above-mentioned touch panel.

The external storage device 58 has a storage medium such as a DVD or a CD-ROM on which data relating to maps, data relating to roads, etc., is recorded. The data relating to maps, the data relating to roads, etc., that is recorded on the recording medium is used when the vehicular apparatus 2 itself searches for a route to a destination and generates route guidance information, because it cannot receive route guidance data from the information center 1. The external storage device 58 may be a device having a writable recording medium, such as a hard disk drive. In this case, the user may acquire data relating to maps and data relating to roads from the information center 1 (e.g., an Internet server) and record that data on the recording medium.

Next, the operations of the information center 1 and the vehicular apparatus 2 having the above-described configurations will be explained.

Operation of the Information Center

Figure 10:
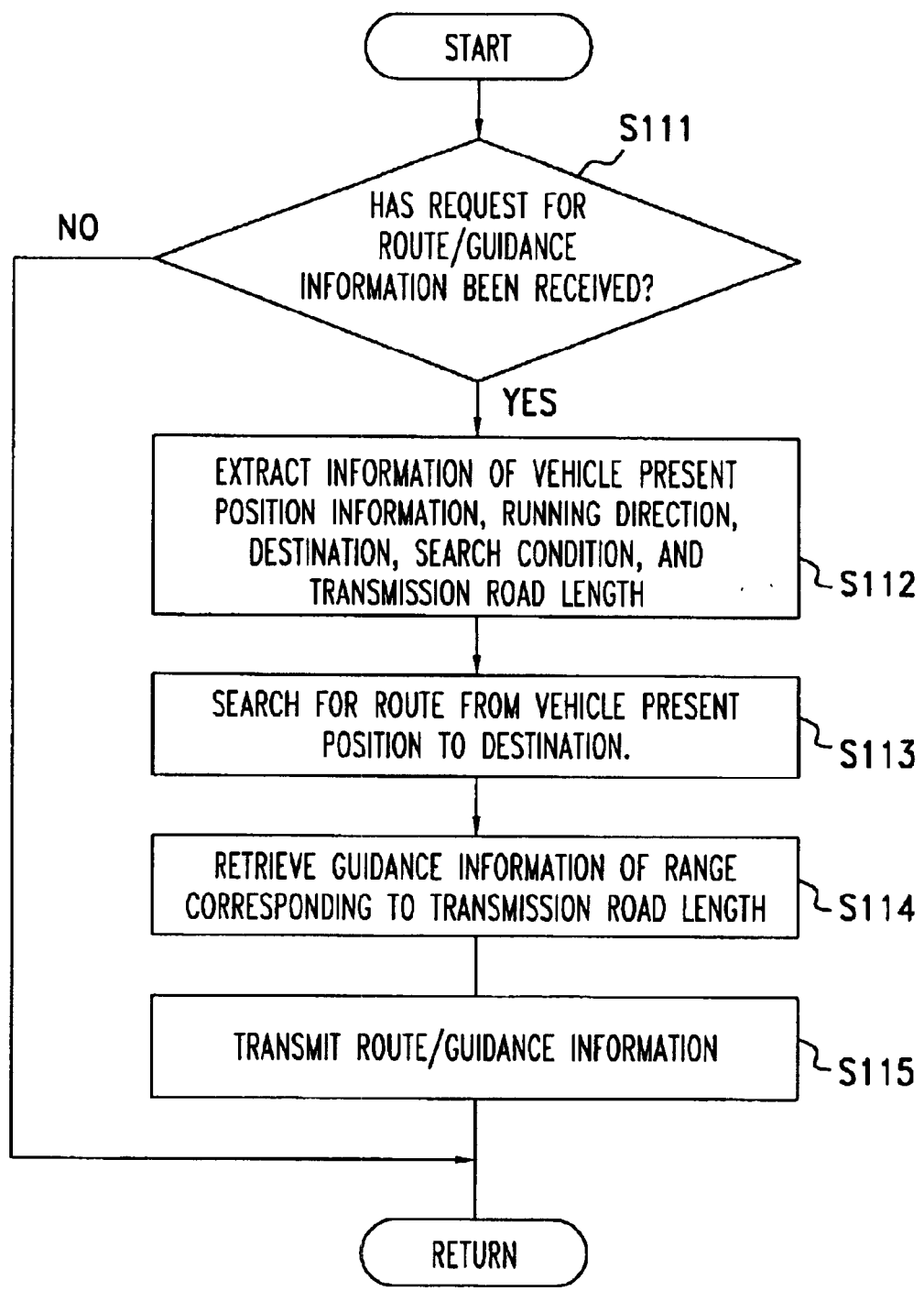
FIG. 10 is a flowchart of a routine for route searching and guidance information transmitting within the information center of the navigation system of FIG. 9.

First, the operation of the information center 1 will be described with reference to the flowchart of FIG. 10, which shows a route search/guidance information transmission operation of the information center 1.

In the vehicular apparatus 2, the control program 63 that is stored in the memory 54 is executed by the computation section 53. In this state, if the data request program 62 that is stored in the memory 54 is executed in response to an input by the user, various types of information, that is, the vehicle present position that has been determined by the position determination section 52, direction of travel, the destination, the type of road on which the vehicle present position is located, the search condition, if any, (e.g., priority given to toll roads or ordinary roads), and the set road length (a road length set for transmission) indicating a range for which route guidance is needed, are transmitted from the transmission/reception section 51 to the information center 1. The ID of the associated vehicle is transmitted at the same time to differentiate the associated vehicle from other vehicles.

In the information center 1, the above items of information are received by the transmission/reception section 10 ("yes" at step S111) and supplied to the computation section 20. Packet communication is performed between the information center 1 and the vehicular apparatus 2.

The computation section 20 of the information center 1 executes the system control program 22e that is stored in the memory 22. Receiving the items of information from the vehicular apparatus 2, the CPU 21 performs a route search by executing the route search program 22a that is stored in the memory 22. First, the CPU 21 extracts, from the received information, items of information such as the vehicle present position information, the destination information, the travel direction, the type of road on which the present position is located, the search condition, and the set transmission road length (step S112), and searches for a route from the vehicle present position to the destination based on the extracted items of information (step S113).

The route search is performed by referring to the route search data 31a of the database 31, that is, the intersection data, the road data, and the node data. The route search operation itself is a known technique. A recommended route is set under prescribed conditions such as a condition that the route whose overall length is the shortest should be designated as the optimum route (refer to Japanese Patent Laid-Open Nos. 173297/1989 and 173298/1989).

Then, the CPU 21 of the computation section 20 of the information center 1 executes the guidance information extracting program 22c that is stored in the memory 22 and thereby retrieves, by referring to the guidance data 31b of the database 31, information of a range that was set by the road length setting program 22b (step S114). The extracted route guidance information is stored temporarily in the memory 22 as route guidance data 22f. The CPU 21 of the computation section 20 causes the transmission/reception section 10 to transmit the route guidance data 22f to the vehicular apparatus 2 together with the ID of the vehicle that made the request (step S115).

If the end of the route section, for which route guidance information has been previously generated and transmitted, is located on an expressway, the road length setting program 22b sets a route guidance range corresponding to a route (preliminary route; much shorter than a transmission road length) from the end of that section located on an expressway to the closest interchange, service area, or parking area ahead. The CPU 21 executes the guidance information extracting program 22c and thereby retrieves, by referring to the guidance data 31b of the database 31, guidance information for the route guidance range thus set (step S114). The extracted route guidance information (preliminary route guidance information) is stored temporarily in the memory 22 as route guidance data 22f. The CPU 21 of the computation section 20 causes the transmission/reception section 10 to transmit the route guidance data 22f to the vehicular apparatus 2 together with the ID of the vehicle that made the request (step S115).

Then, the road length setting program 22b sets a remaining route guidance range for the remaining route which is equal to the set transmission road length minus the road length of the preliminary route. The CPU 21 then executes the guidance information extracting program 22c and thereby retrieves, by referring to the guidance data 31b of the database 31, guidance information for the remaining route guidance range thus set (step S114). The extracted route guidance information (remaining route guidance information) is stored temporarily in the memory 22 as route guidance data 22f. The CPU 21 of the computation section 20 causes the transmission/reception section 10 to transmit the route guidance data 22f to the vehicular apparatus 2 together with the ID of the vehicle that made the request (step S115).

The transmission of the preliminary route guidance information (route guidance data 22f) of the preliminary route is completed in a short time because the preliminary route is relatively short and hence the amount of data is small. In contrast, the transmission of the remaining route guidance information (route guidance data 22f) for the remaining route, i.e., the recommended route minus the preliminary route, takes a much longer time than the transmission of the preliminary route guidance information because the remaining route is longer than the preliminary route and hence the amount of data is larger.

In this embodiment, the information center 1 searches for a route from a vehicle present position to the destination every time it receives a request from the vehicular apparatus 2. In the information center 1, the external information collecting section 40 acquires road information, traffic information, etc. from the external sources and the database 31 is updated accordingly. By virtue of a route search performed in response to each request from the vehicular apparatus 2, the information center 1 can supply the vehicular apparatus 2 with a recommended route that has been determined based on the latest data in such a manner as to avoid traffic jams, construction locations, accident locations, and the like, or to use a new road, as well as guidance information for the recommended route.

Operation of the Vehicular Apparatus

Next, the operation of the vehicular apparatus 2 will be described with reference to flowcharts of FIGS. 11 and 12, which show a requesting and route guidance routine executed by the vehicular apparatus 2.

At step S131, the user sets a destination by using prescribed switches of the input section 55. At step S132, the user sets a search condition (giving priority to an ordinary road or to a toll road). For convenience of description, it is assumed that the search condition that priority is given to a toll road or expressway has been set. When the destination and the search condition have been set, at step S133 the computation section 53 of the vehicular apparatus 2 judges whether to acquire route guidance information for a route to the destination using the information center 1 or using the route search program 65 of the vehicular apparatus 2 itself. This judgment is performed based on a setting that has been made in advance by using a prescribed switch of the input section 55. In this embodiment, for convenience of description, it is assumed that a selection has been made that route guidance data of a route to the destination should be acquired by using the information center 1.

Therefore, judging that route guidance information should be acquired from the information center 1 ("yes" at step S133), the computation section 53 of the vehicular apparatus 2 goes to step S134, where it transmits, to the information center 1, together with an ID, information identifying the destination, the search condition, a vehicle present position that has been determined by the position determination section 52, and a road length, as necessary for a route search and extraction of guidance information. Then, the computation section 53 receives, from the information center 1, the results of the route search that has been performed by the information center 1 based on the information as to the destination, the vehicle present position, the search condition, the transmission road length, etc. More specifically, the information center 1 transmits the search results for a range corresponding to the set transmission road length. The computation section 53 receives it and stores it temporarily in the data storage area 54b of the memory 54 (step S135), and then performs a guidance information receiving operation (step S136).

Figure 13:
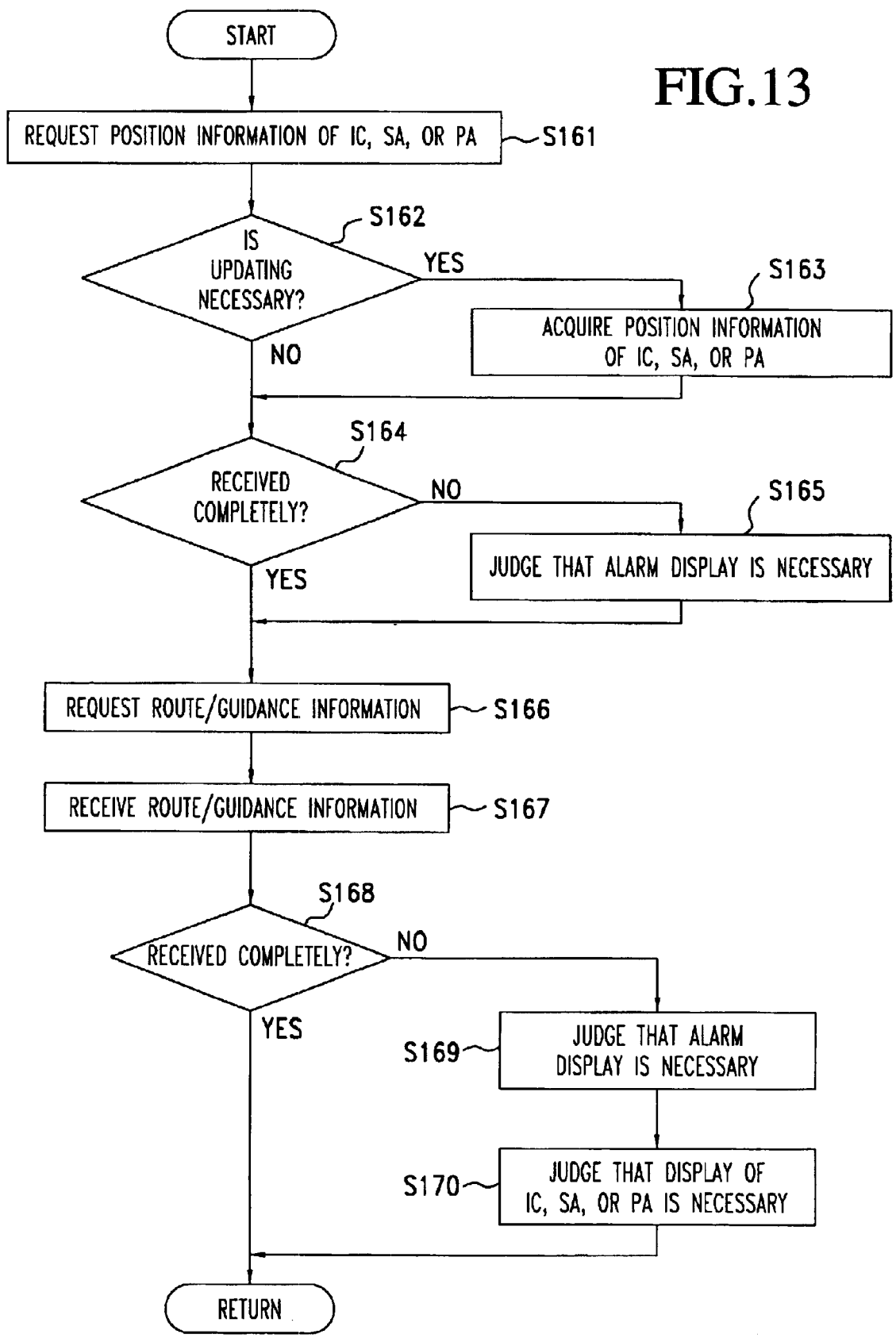
FIG. 13 is a flowchart showing routine for receiving guidance information executed within the vehicular apparatus of the navigation system of FIG. 9.

FIG. 13 is a flowchart showing a guidance information receiving subroutine. Referring to FIG. 13, if the end of a section of the recommended route, for which route guidance information has been previously received, lies on an expressway, the computation section 53 requests the information center 1 to send back position information for an interchange (IC), a service area (SA), or a parking area (PA) (step S161; "no" at step S162) and receives, from the information center 1, route guidance information (preliminary route guidance information) for a route to an interchange, a service area, or a parking area. Then, the computation section 53 judges whether all the preliminary route guidance information for the route to the interchange, service area, or parking area has been received. If it has been received completely ("yes" at step S164), the computation section 53 requests the information center 1 to send back remaining route guidance information for the remaining route which is the recommended route minus the preliminary route (step S166). If the preliminary route guidance information has not been received completely ("no" at step S164), the computation section 53 judges that this is due to an interruption of the communication and displays an alarm message to that effect on the display section 56. (step S165).

In response to the request transmitted at step S166, since this is the first execution of the process and no previous route guidance information has been acquired, route guidance information for a range corresponding to the set transmission road length is immediately transmitted from the information center 1. The computation section 53 of the vehicular apparatus 2 receives this route guidance information and stores it in the data storage area 54b (step S167). Then, the computation section 53 of the vehicular apparatus 2 judges whether all the route guidance information has been received, that is, whether the route guidance information has been stored without any break in the communication with the information center 1 (step S168). If all the route guidance information has been stored in the data storage area 54b ("yes" at step S168), the guidance information receiving operation is finished and processing returns to the main routine.

If not all of the route guidance information of the range corresponding to the set transmission road length has been stored in the data storage area 54b due to a break in the communication ("no" at step S168), an alarm message to that effect is displayed on the display section 56. Then, if preliminary route guidance information was stored into the data storage area 54b at step S163, the computation section 53 of the vehicular apparatus 2 judges that it is necessary to generate a route guidance display based on the preliminary route guidance information (step S170). Then, the guidance information receiving operation is finished and processing returns to the main routine.

On the other hand, if the end of the route section covered by the previously received route guidance information is not on an expressway, the computation section 53 does not request the information center 1 to send back information on position of an interchange (IC), a service area (SA), or a parking area (PA) (step S161; "yes" at steps S162 and S164) and, instead, requests the information center 1 to send back route guidance information for a range corresponding to the set transmission road length (step S166). Since this is the first execution of the process and no previous route guidance information has been acquired, the computation section 53 immediately requests the information center 1 to send back route guidance information for a range corresponding to the set transmission road length.

The computation section 53 of the vehicular apparatus 2 receives, from the information center 1, route guidance information for a range corresponding to the set transmission road length and stores it in the data storage area 54b (step S167). Then, the computation section 53 of the vehicular apparatus 2 judges whether all the route guidance information has been received, that is, whether the route guidance information has been stored without a break in communication with the information center 1 (step S168). If all the route guidance information has been stored in the data storage area 54b ("yes" at step S168), the guidance information receiving operation is finished and processing returns to the main routine.

Upon return to the main routine and, for example, the car starts running or a guidance start switch of the input section 55 is activated, the computation section 53 of the vehicular apparatus 2 starts route guidance display based on the route guidance data 71 stored in the data storage area 54b of the memory 54 (step S140). Route guidance by the vehicular apparatus 2 is started at this point in time.

If it is judged at step S133 that the vehicular apparatus 2 itself should acquire route guidance information for a route to the destination using its own route search program 65 ("no" at step S133), the computation section 53 starts executing the route search program 65 (step S137). The computation section 53 searches for a route to the destination using the information that is stored in the external storage device 58 and acquires a search result (step S138). The computation section 53 generates route guidance information for a range corresponding to the prescribed (e.g., "set") road length by executing the guidance information extracting program 66, and stores it in the data storage area 54b (step S139). In this case, neither preliminary route guidance information nor remaining route guidance information for a range corresponding to the remaining route is generated.

Then, as in the case where route searches are performed by the information center 1, when the car starts to move or the guidance start switch of the input section 55 is activated, the computation section 53 of the vehicular apparatus 2 starts route guidance display based on the route guidance information that is stored in the data storage area 54b of the memory 54 (step S140).

After the route guidance has been started, the computation section 53 updates the present position on the picture of the display section 56 using the route guidance information (step S141). Then, the computation section 53 judges whether to update the route guidance information (step S142). As the guidance display is performed based on the route guidance information for the range corresponding to the set transmission road length that has been received from the information center 1, the route on which the present position is displayed comes to termination point and the route ahead is not displayed. It is therefore necessary to always secure a predetermined amount of route guidance information. In view of this, in this embodiment, it is judged whether the present position has reached a position a prescribed distance from the end of the route segment for which route guidance information has been previously received. If the present position has reached such a position ("yes" at step S142), a guidance information updating operation for updating the route guidance information, that is, acquiring new route guidance information for the route ahead, is performed (step S143). An alternative operation is possible in which a judgement is made as to whether the vehicle has covered a predetermined distance and a guidance information updating operation is performed (step S143) if the vehicle has covered the predetermined distance ("yes" at step S142).

Figure 11:
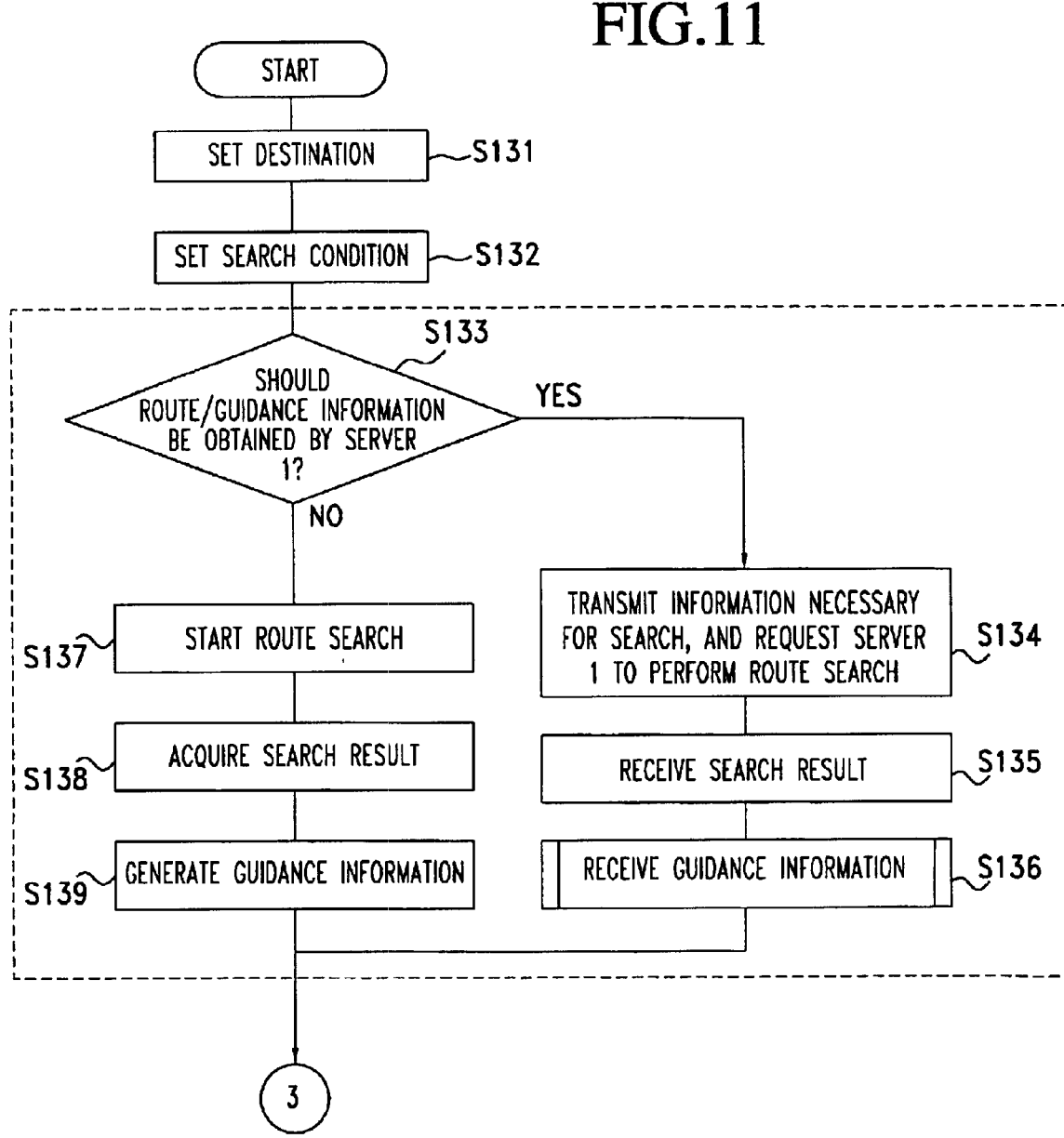
FIGS. 11 and 12 are flowcharts of a routine for requesting and route guidance executed within the vehicular apparatus of the navigation system of FIG. 9.
Figure 12:
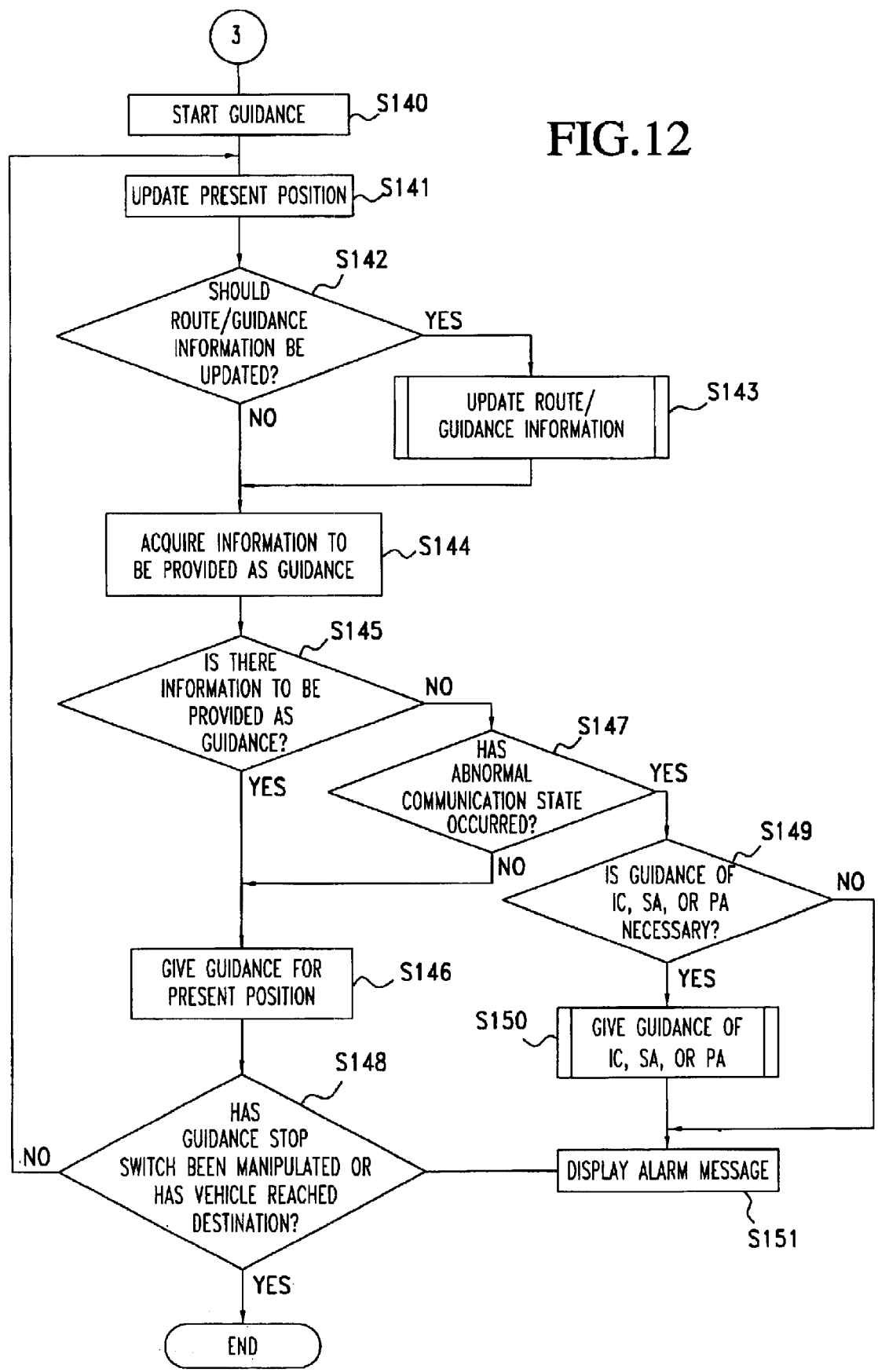

The guidance information updating operation is the same as steps S133–S139 that are enclosed by the broken line in the main routine of FIG. 11. That is, in the guidance information updating operation, to acquire route guidance information to the destination from the information center 1, route guidance information for a range corresponding to the next set transmission road length (recommended route segment length) or preliminary route guidance information and remaining route guidance information for a range corresponding to a route segment minus the preliminary route.

Thus, in the guidance information updating operation, if the end of the route section covered by the preceding route guidance information is on an expressway, preliminary route guidance information is first received and then remaining route guidance information for a range corresponding to a route segment of set length minus the preliminary route is received.

When the route guidance has just started, the vehicle has not reached a position the prescribed distance from the end of a route segment for which guidance data has been received. Therefore, the computation section 53 searches the current route guidance information (route guidance data 71) for information to be provided as guidance (step S144). If information to be provided as guidance is found in the current route guidance information (route guidance data 71)

("yes" at step S145), the computation section 53 outputs the information to be provided as guidance to the display section 56 (step S146).

Conversely, if no information to be provided as guidance is found in the current route guidance information ("no" at step S145), the computation section 53 judges whether the communication with the information center 1 has been interrupted due to an abnormal communication state (step S147). If no abnormal communication state exists ("no" at step S147), the computation section 53 recognizes that there is no information to be provided as guidance (step S146).

Then, the computation section 53 judges whether the vehicle has reached the destination or a guidance stop switch of the input section 55 has been activated (step S148). If the vehicle has not yet reached the destination and the guidance stop switch of the input section 55 has not been activated ("no" at step S148), the process returns to step S141. Conversely, if the vehicle has reached the destination or the guidance stop switch of the input section 55 has been activated ("yes" at step S148), the computation section 53 finishes the route guidance.

From this time forward, so long as the communication is not disrupted ("broken" or "lost"), route guidance is performed until reaching the destination while the route guidance information is updated in the guidance information updating operation of step S143, that is, new route guidance information for the route ahead is received and stored as route guidance data 71, each time the vehicle has covered the predetermined distance ("set transmission road length" or "prescribed length"). When the vehicular apparatus 2 has received new route guidance information, if the end of the route segment covered by the most recent previous route guidance information is on an expressway (or a toll road) and the expressway (or the toll road) extends along the recommended route from that segment end, the vehicular apparatus 2 receives preliminary route guidance information and stores it also as route guidance data 71 and then receives remaining route guidance information and stores it as route guidance data 71.

On the other hand, if an abnormal communication state has occurred ("yes" at step S147), the computation section 53 judges whether it is necessary to give guidance based on the route guidance data 71 stored in the data storage area 54b of the memory 54 (step S149). If route guidance for the present position can be given satisfactorily based on primary route guidance information (i.e., route guidance information for a range corresponding to the set transmission road length or route guidance information for a range corresponding to a remaining route, i.e., the route corresponding to the set transmission road length minus a preliminary route, ("no" at step S149), an alarm message to the effect that the communication has been interrupted is displayed on the display section 56 (step S151) and the process goes to step S148.

Therefore, even if an abnormal communication state has occurred, when route guidance for the present position is being given based on only primary route guidance information, the vehicular apparatus 2 performs route guidance based on the primary route guidance information while displaying a message to the effect that an abnormal communication state has occurred.

If it is judged that guidance for the present position needs to be given based on the preliminary route guidance information ("yes" at step S149), a preliminary route guidance operation is performed in which guidance is given until the vehicle reaches the interchange, service area, or parking area by using the preliminary route guidance information (route guidance data 71) that is stored in the data storage area 54b of the memory 54 (step S150).

If the communication with the information center 1 is interrupted during a lengthy transmission, from the information center 1, of route guidance information of a range corresponding to a set transmission road length, all the route guidance information of that transmission (including that part which has already been received) is lost and hence the route ahead of the end of the route segment covered by the guidance display, based on the route guidance information that is stored in the data storage area 54b of the memory 54, will not be displayed. Accordingly, if the end of the route segment covered by the preceding route guidance information is on an expressway, preliminary route guidance information which can be transmitted in a short time is first transmitted and then the remaining route guidance information for the remainder of the route segment, that is the route segment which is the subject of the current transmission minus the preliminary route, which transmission takes a significantly longer time, is then transmitted. That is, the new route guidance information is transmitted in two part packets, the first packet part being the first route guidance data 71 (preliminary route guidance information) transmitted, which data can be transmitted within a short period of time to guard against the possibility that communication might be lost during travel of that route segment which is the subject of the current transmission. In this manner, at least the preliminary route guidance information is reliably received.

If it is judged that guidance needs to be given for the present position based on the first-received preliminary route guidance information, in the case where the first-received preliminary route guidance information has been received and stored ("yes" at step S149), a preliminary route guidance operation is performed using the preliminary route guidance information (route guidance data 71) (step S150).

Figure 14:
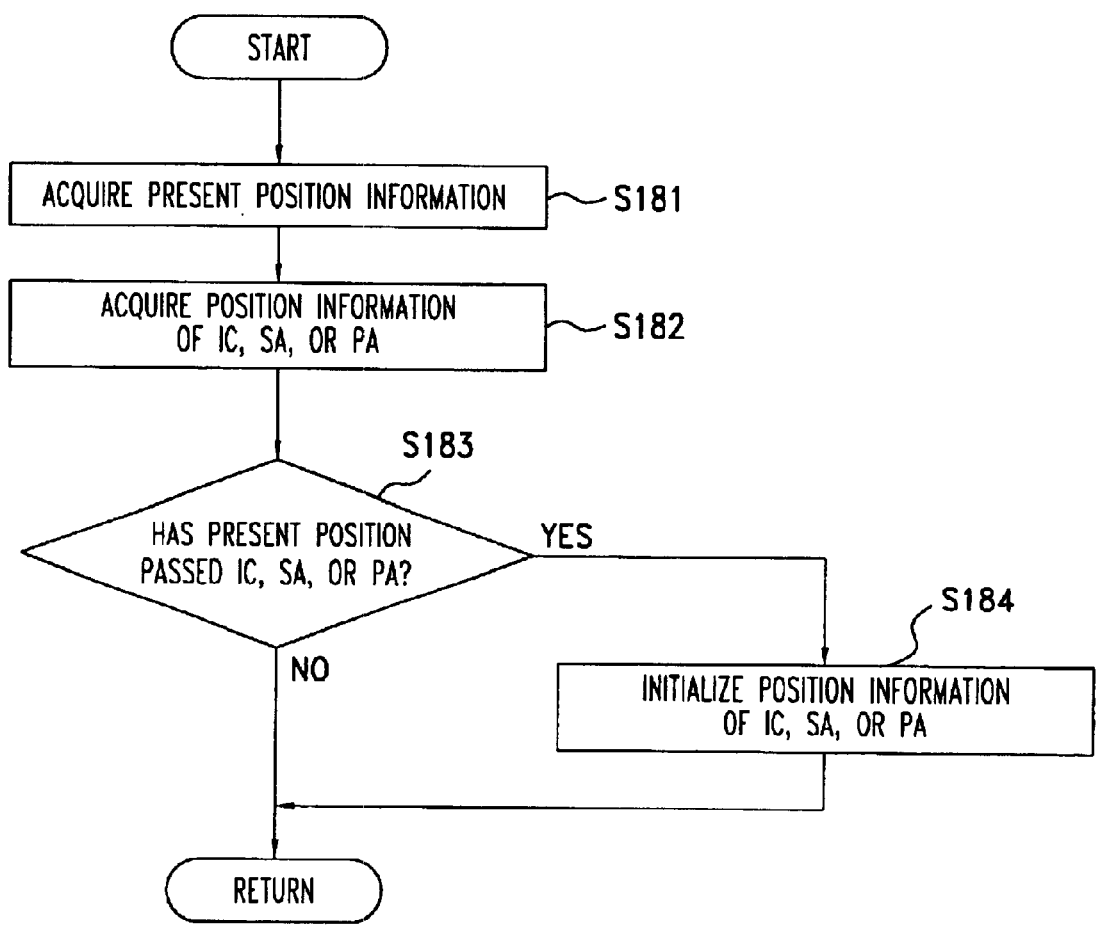
FIG. 14 is a flowchart of a routine for providing preliminary route guidance to the vehicular apparatus of the car navigation system of FIG. 9.

FIG. 14 is a flowchart showing a preliminary route guidance subroutine. Referring to FIG. 14, the computation section 53 acquires present position information from the position determination section 52 (step S181) and extracts information data for an interchange, a service area, or a parking area (step S182). Then, the computation section 53 compares the present position with the position of the interchange, service area, or parking area and judges whether the present position has passed (reached) the position of the interchange, service area, or parking area (step S183).

If the present position has not yet reached the position of the interchange, service area, or parking area ("no" at step S183), the computation section 53 gives route guidance using the preliminary route guidance information and the process goes to step S151 of the main routine. In this manner, even when part of an expressway (or a toll road) ahead can not be displayed while the vehicle is running on the expressway, route guidance can be performed until the vehicle reaches the nearest interchange, service area, or parking area ahead.

Conventionally, where data for a new expressway (or toll road) is not stored in the external storage device 58 of the vehicular apparatus 2, improper route guidance is given in that the vehicle present position is displayed without showing the new expressway. In contrast, even if the communication has been disrupted so that no route guidance information can be acquired from the information center 1, guidance for a route (preliminary route) to an interchange of the new expressway, where it connects to a road for which data is stored in the external storage device 58 of the vehicular apparatus 2, allows the vehicle to travel without guidance to the position from which route guidance can be performed.

When the present position has reached the interchange, service area, or parking area ("no" at step S183), the computation section 53 judges that the vehicle has reached the closest interchange, service area, or parking area and initializes the preliminary route guidance information (step S184). The route guidance using the preliminary route guidance information is thus finished and the process goes to step S151 of the main routine.

If the vehicle reaches the interchange, for example, and communication with the information center 1 remains impossible and remaining route guidance information for a remaining route segment ahead of the preliminary route has not yet been received, the vehicular apparatus 2 performs route guidance from the interchange to the destination by executing its own route search program 65 and guidance information extracting program 66 using the information stored in the external storage device 58. After reaching the service area or the parking area, the vehicle may stay there waiting for recovery of communication with the information center 1.

Next, advantages of the above communication-type car navigation system will be described.

(1) In this embodiment, if the end of a route segment covered by the preceding route guidance information is on an expressway, preliminary route guidance information which can be transmitted in a short time is transmitted first and then remaining route guidance information for the remaining route segment (a route segment minus the preliminary route), the transmission of which takes a longer time, is transmitted. That is, new route guidance information is transmitted in two transmission parts, with the preliminary route guidance information transmitted first, within a relatively short time, to guard against the possibility that communication might be lost during travel of the route segment covered by the current transmission. In this manner, the vehicular apparatus 2 can receive the preliminary route guidance information so quickly that the probability of disconnection of communication during transmission of same is low.

(2) In this embodiment, new route guidance information for each successive route segment is transmitted as two transmissions with the preliminary route guidance information is transmitted first within a short time. Even if lack of communication with the information center 1 persists and guidance for part of an expressway (or a toll road) ahead of the present position can not be displayed, preliminary route guidance can be provided for guidance to an interchange, a service area, or a parking area that is ahead of and closest to the present position, i.e., a route (preliminary route) can be displayed until the vehicle reaches an interchange, a service area, or a parking area that is ahead of and closest to the present position. This can prevent improper route guidance wherein the vehicle present position is displayed on the screen but part of a new expressway (or toll road) ahead of the present position can not be displayed because data for the new expressway (or toll road) is not stored in the external storage device 58 of the vehicular apparatus 2.

(3) Further, in this embodiment, once guidance is given for a preliminary route to an interchange, the vehicular apparatus 2 can properly perform route guidance from the interchange to a destination using ordinary roads by executing the route search program 65 and the guidance information extracting program 66 that are stored in the external storage device 58, even if a communication failure disables route guidance using route guidance information that should be transmitted from the information center 1, because the interchange is connected to an ordinary road for which data is stored in the external storage device 58 of the vehicular apparatus 2.

(4) In this embodiment, where a service area or a parking area exists before an interchange, guidance is given for a preliminary route to the service area or the parking area. In this case, the vehicle can stay in the service area or the parking area waiting for recovery of communication with the information center 1.

This embodiment may be modified in the following manners:

In the embodiment, preliminary route guidance information corresponding to one of an interchange, a service area, and a parking area, that is closest to the end of the route segment covered by the preceding route guidance information, is generated. Alternatively, preliminary route guidance information corresponding to the interchange, rather than the service area or the parking area, that is closest to the end of the route segment covered by the preceding route guidance information may be generated. Conversely, preliminary route guidance information corresponding to the service area or the parking area, rather than the interchange, that is closest to the end of the route segment covered by the preceding route guidance information may be generated.

As a further alternative, both the preliminary route guidance information corresponding to the interchange that is closest to the end of the route covered by the preceding route guidance information and that corresponding to the service area or the parking area that is closest to the end of the route segment covered by of the preceding route guidance information may be generated.

In the embodiment described above, a transmission corresponding to a set road length is transmitted from the vehicular apparatus 2 to the information center 1 and the information center 1 generates route guidance information to be transmitted in one attempt (attempted or effected transmission) based on the transmission road length. Alternatively, the information center 1 determines a road length and generates route guidance information to be transmitted to the vehicular apparatus 2 in one attempt based on the determined road length.

In the described embodiment, when a state of abnormal communication has arisen, route guidance is automatically performed by using preliminary route guidance information. Alternatively, whether to perform route guidance using preliminary route guidance information may be determined by the user by activation a switch of the input section 55.

In the described embodiment, the exit ("escape") location is an interchange, a service area, or a parking area of an expressway (or a toll road). In the case of a multi-level toll road, the exit location may be an upper level of the multi-level toll road. In this case, the road search data 31a should include upper level information for the multi-level road.

According to the present invention, when the communication between the information delivery center and the vehicular route guidance apparatus is disrupted and guidance for part of a toll road (or expressway) ahead of its position can not be displayed, preliminary route guidance is given from that position to an escape position ahead using preliminary route guidance information. This can prevent improper route guidance where the vehicle present position would be displayed on the screen without display of that part of a new toll road (or expressway) ahead of its present position, i.e., where the data for the new toll road (or expressway) is not stored in the road data storing means of the vehicular route guidance apparatus.

According to the invention, since an escape position (interchange, service area, or parking area) on the toll road (or expressway) is ahead of and closest to the above-mentioned present position, the vehicle can reach the escape position in a short time and can wait there for restoration of communication.

Embodiment 3

Next, modifications (third embodiment) of the above information center 1 and vehicular apparatus 2 will be described.

In this third embodiment, the information center 1 searches for a route from a vehicle present position to a destination every time it receives a request from the vehicular apparatus 2. In the information center 1, the external information collecting section 40 acquires road information, traffic information, etc. from external sources and the database 31 is updated accordingly. By virtue of the procedure that a route search is performed in response to each request from the vehicular apparatus 2, the information center 1 can supply the vehicular apparatus 2 with a recommended route that has been determined based on the latest data and in such a manner as to avoid traffic jams, construction locations, traffic accidents, and the like or to use a new road, as well as guidance information for the recommended route.

Figure 15:
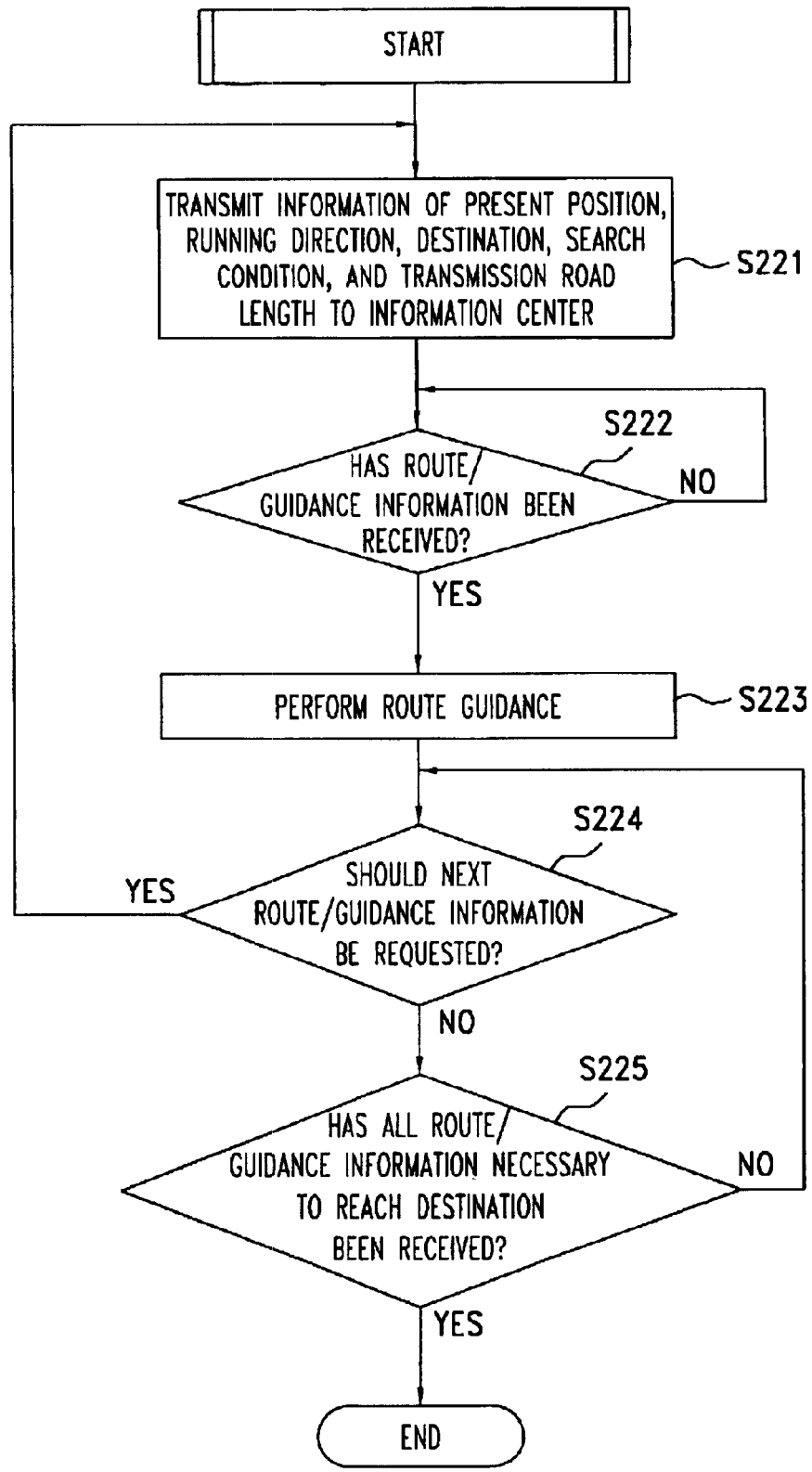
FIG. 15 is a flowchart showing a requesting and route guidance operation of a vehicular apparatus according to a third embodiment of the invention.

Next, the operation of the vehicular apparatus 2 will be described with reference to FIG. 15 which illustrates the operation of acquiring route guidance information from the information center 1 and causing the display section 56 and the voice output section 57 of the vehicular apparatus 2 to output route guidance information for a route to a destination for each transmission.

At step S221, the computation section 53 of the vehicular apparatus 2 transmits, to the information center 1, together with an ID, information as to the vehicle present position that has been determined by the position determination section 52, direction of travel, type of road on which the present position is located, destination, transmission road length, and a search condition. Then, the computation section 53 waits for reception of route guidance information to be transmitted from the information center 1 in response to receipt of the above information (step S222).

When receiving route guidance information that is transmitted from the information center 1 ("yes" at step S222), the computation section 53 stores the received route guidance information in the data storage area 54b of the memory 54 as route guidance data 71. Then, the computation section 53 generates guidance using the received route guidance information (route guidance data 71) by executing the route guidance program 61 (step S223). That is, a map including a route and landmarks is displayed on the display section 56 and a guidance voice is output from the voice output section 57 when, for example, a right or left turn is necessary at an intersection.

At the same time, the computation section 53 refers to a vehicle present position in the position measuring section 52 and executes the data request program 62. If the vehicle present position has reached a position a predetermined distance (e.g., 200 m) from the end of the received route segment, the computation section 53 requests the next packet of route guidance information ("yes" at step S224). In response, the same operations as were performed above in response to the information that was transmitted to the information center 1 at step S221 are performed in the information center 1 and the resulting packet of new route guidance information is transmitted to the vehicular apparatus 2.

On the other hand, if the next route guidance information packet is not requested ("no" at step S224), the computation section 53 judges whether all route guidance information necessary for guidance to reach the destination has been received (step S225). The operation is finished if all route guidance information has been received.

In summary, the vehicular apparatus 2 transmits, to the information center 1, information of a vehicle present position, travel direction, type of road on which the present position is located, a destination, a transmission road segment length, and a search condition. The information center 1 performs a route search based on the received information and generates route guidance information (route guidance data 22f). The information center 1 transmits the generated route guidance information to the vehicular apparatus 2 and the vehicular apparatus 2 performs route guidance based on the received route guidance information (route guidance data 71).

Route guidance information (route guidance data 71) that is no longer necessary is discarded. When continuation route guidance information has become necessary (step S224), the vehicular apparatus 2 again transmits, to the information center 1, information of a vehicle present position, travel direction, type of road on which the present position is located, destination, transmission road segment length, and a search condition (step S221). Similar operations are thereafter repeated until the vehicle reaches the destination.

Next will be described an operation that is performed by the vehicular apparatus 2 when a failure has occurred in the communication with the information center 1, which failure prevents acquisition of route guidance information from the information center 1. This embodiment is characterized in how to deal with the situation which arises when a failure in communication prevents acquisition of route guidance information for a route segment ahead of the present position, as described below in detail.

Figure 16:
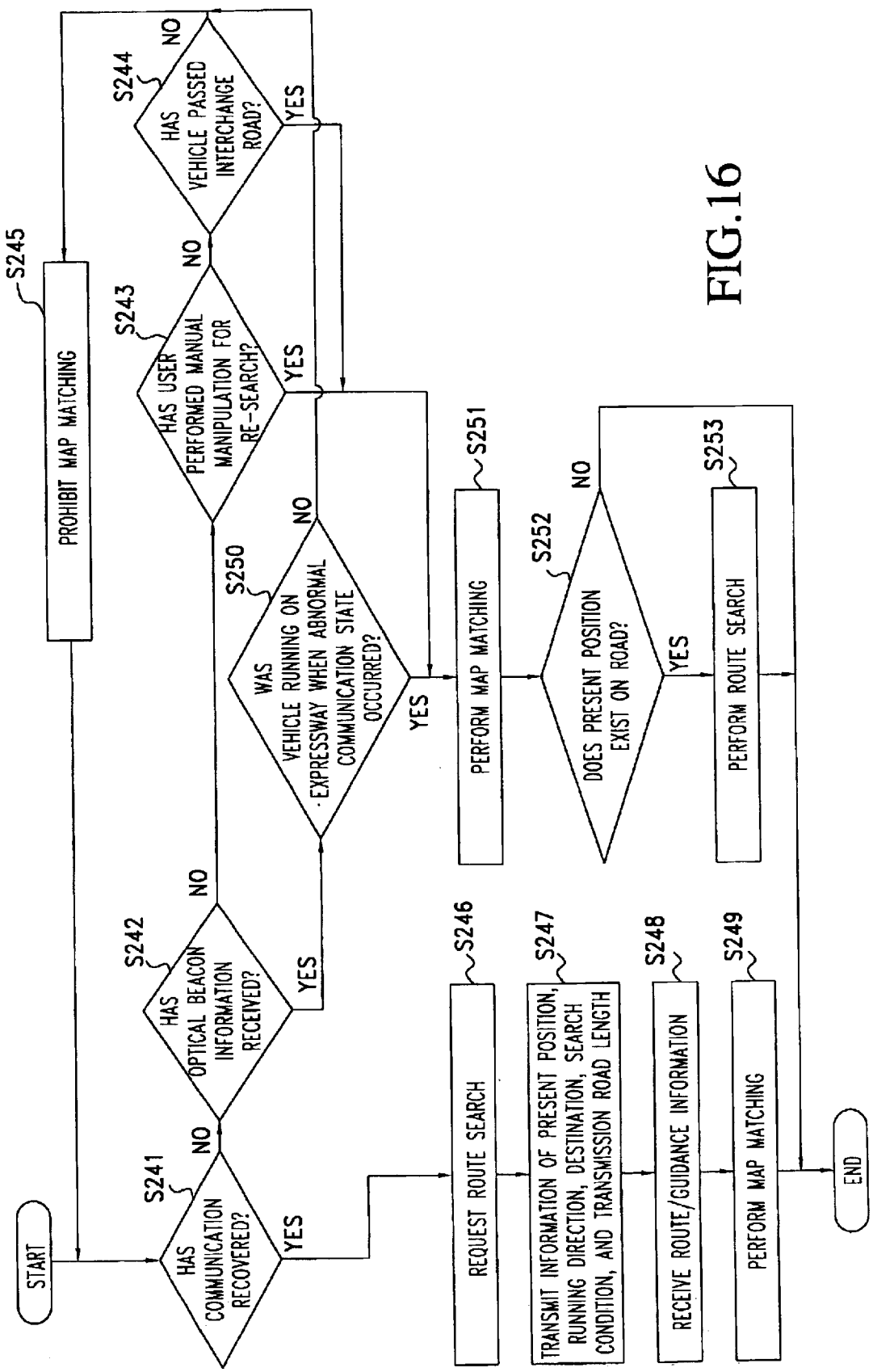
FIG. 16 is a flowchart of a route guidance operation that is performed in the vehicular apparatus when a communication problem has occurred, according to the third embodiment of the invention.

FIG. 16 is a flowchart showing an operation that is performed by the computation section 53 of the vehicular apparatus 2 by execution of communication failure countermeasure program 67 when route guidance information for the route segment ahead of the present position is not available due to a failure in communication. For convenience of description, it is assumed that an abnormal communication state has arisen during the vehicle's travel on an expressway (or a toll road) which prevents acquisition of route guidance information for a route segment ahead of the present position.

First, the computation section 53 judges whether communication with the information center 1 has recovered (step S241). If communication has not yet recovered ("no" at step S241), the computation section 53 judges whether optical beacon information has been received (step S242). In general, VICS optical beacons are installed alongside ordinary roads. The receipt of optical beacon information by the transmission/reception section 51 means that the vehicle has entered onto ordinary road upon exit from the expressway. Therefore, when receiving optical beacon information via the transmission/reception section 51, the computation section 53 judges that the vehicle exited the expressway and is now travelling on an ordinary road.

If no optical beacon information has been received ("no" at step S242), that is, if the computation section 53 judges that the vehicle is not travelling on an ordinary road that is provided with VICS optical beacons, the computation section 53 judges whether a re-search switch of the input section 55 has been activated to cause the vehicular apparatus 2 to perform a re-search (step S243). That is, the computation section 53 judges whether the user has recognized an abnormal communication state and has performed a manual action to cause the vehicular apparatus 2 to search for a route to the destination using the data of the external storage device 58, by execution of the route search program 65.

If the re-search switch of the input section 55 has not been activated ("no" at step S243), the computation section 53 judges whether the vehicle has passed an interchange for exit from the expressway onto an ordinary road (step S244). Specifically, the computation section 53 calculates curvature of each road section of a predetermined length on which the vehicle is travelling and judges whether the calculated curvature, which represents a road shape, coincides with curvature of a looped interchange that is stored in the memory 54 in advance. If the calculated road curvature coincides with curvature of a looped interchange, the computation section 53 judges that the vehicle has exited the expressway at that interchange to enter onto an ordinary road. Conversely, if the calculated road curvature does not coincide with curvature of any looped interchange, the computation section 53 judges that the vehicle has not exited the expressway at an interchange.

If the computation section 53 judges that the vehicle has not exited the expressway at an interchange ("no" at step S244), the computation section 53 prohibits map matching (step S245). That is, the computation section 53 prohibits map matching with a judgment that the vehicle continues to run on the expressway after the occurrence of the communication failure and the re-search switch of the input section 55 has not been activated. Since map matching has been prohibited, the process goes to step S241 without again searching for a route to the destination by the computation section 53. At step S241, the computation section 53 again judges whether communication with the information center 1 has recovered.

As described above, the computation section 53 of the vehicular apparatus 2 does not perform map matching or a re-search if a communication failure occurred while the vehicle was running on an expressway and the vehicle is still running on the expressway with the communication failure continuing. As a result, for example, in the case where the expressway is a new expressway and the road data for the new expressway is not stored in the external storage device 58 of the vehicular apparatus 2, the vehicular apparatus 2 does not provide an improper display or improper route guidance, i.e., guidance by which the vehicle present position would be erroneously shown on the closest ordinary road for which road data is stored in the external storage device 58, rather than correctly shown on the new expressway by map matching.

If communication with the information center 1 recovers while the vehicle is travelling in the state that map matching and a route re-search are prohibited ("yes" at step S241), the computation section 53 requests the information center 1 to perform a route search (step S246) and transmits, to the information center 1, information for the vehicle present position, travel direction, type of road on which the present position is located, destination, transmission road segment length, and search condition (step S247).

The vehicular apparatus 2 receives route guidance information generated by the information center 1 in due course (step S248) and the computation section 53 performs map matching based on the received route guidance information (route guidance data 71) (step S249). From this time forward, the vehicular apparatus 2 performs route guidance based on the route guidance information received (route guidance data 71) in communication with the information center 1.

On the other hand, if optical beacon information has been received ("yes" at step S242), the computation section 53 judges that the vehicle is running on an ordinary road and judges whether the vehicle was running on the expressway when the communication failure occurred (step S250). If the vehicle was running on an expressway when the communication failure occurred ("yes" at step S250), the computation section 53 performs map matching with a judgment that the ordinary road that the vehicle entered after exiting the expressway is an ordinary road for which road data is stored in the external storage device 58 (step S251). That is, the vehicular apparatus 2 performs map matching with a judgment that the road data of its own external storage device 58 has become usable.

If the vehicle present position has been determined to be off the expressway as a result of the map matching ("yes" at step S252), the computation section 53 searches for a route from the present position to the destination according to the route search program 65 (step S253). From this time forward, the vehicular apparatus 2 provides route guidance by executing the route guidance program 61 using the road data of the external storage device 58 until communication with the information center 1 is restored. Conversely, if the road on which the vehicle present position is located cannot be identified by map matching ("no" at step S252), the computation section 53 finishes execution of the routine without performing a route search. That is, the computation section 53 judges that the ordinary road which the vehicle entered after exiting the expressway is an ordinary road for which road data is not stored in the external storage device 58, in recognition of the fact that a route search with forcible map matching using the road data of the external storage device 58 will lead to improper route guidance.

If it is judged that the vehicle has exited the expressway at an interchange to enter an ordinary road ("yes" at step S244), the computation section 53 judges that the vehicle is now travelling on an ordinary road and performs map matching (step S251). That is, the computation section 53 performs map matching with a judgment that the vehicle is running on an ordinary road for which road data is stored in the external storage device 58 and a route search using the road data of the external storage device 58 has become possible. From this time forward, the computation section 53 executes steps S252 and S253 as in the above-described case and finishes the execution of the program.

If the re-search switch of the input section 55 has been activated ("yes" at step S243), the computation section 53 performs map matching using the road data of the external storage device 58 according to the user's intention (step S251). The computation section 53 then executes steps S252 and S253 as in the above-described case and finishes the execution of the program.

If it is judged that the vehicle was not running on the expressway when a communication failure occurred ("no" at step S250), the process goes to step S245. The process then returns to step S241. That is, in the case where when the communication failure occurred while the vehicle was running on a road other than an expressway (or a toll road), such as a new bypass that is provided with optical beacons, and its road data is not stored in the external storage device 58 of the vehicular apparatus 2, the vehicular apparatus 2 does not perform improper display and route guidance with the vehicle present position indicated to be on an ordinary road for which road data is stored in the external storage device 58, rather than on the new bypass.

Next, advantages of the above communication-type vehicle navigation system will be described below.

(1) In this third embodiment, if the communication with the information center 1 is disrupted (lost) while the vehicle is running on an expressway (or a toll road) and there remains no route portion that is associated with route guidance information, the computation section 53 prohibits map matching and a route search using the road data of the external storage section 58 as long as the vehicle continues to run on the expressway ("no" at steps S242 and S244).

Therefore, in the case where the expressway where the communication failure occurred is a new expressway and the road data for the new expressway is not stored in the external storage device 58 of the vehicular apparatus 2, the vehicular apparatus 2 does not provide an improper route guidance display based on road data for a road which is not the new expressway, by erroneous map matching and route searching using the road data which is stored in the external storage device 58.

(2) In this third embodiment, if the communication with the information center 1 is disrupted while the vehicle is running on an expressway (or a toll road) and there remains no route section that is associated with route guidance information, the computation section 53 performs map matching and a route search using the road data of the external storage section 58 after the vehicle has exited the expressway and entered onto an ordinary road ("yes" at step S242 or S244).

Therefore, in the case where the expressway where the communication failure occurred is a new expressway and the road data for the new expressway is not stored in the external storage device 58 of the vehicular apparatus 2, the vehicular apparatus 2 does not perform map matching or a route search using the road data which is stored in the external storage device 58 until the vehicle exits the expressway. Therefore, proper route guidance display can be started automatically after the vehicle has left the expressway. As a result, no improper route guidance display is performed in the interval between the communication failure and when the vehicle exits the expressway and enters onto an ordinary road.

(3) In the third embodiment, if map matching does not place the vehicle present position on an ordinary road after the vehicle has exited the expressway ("no" at step S252), the route guidance operation is finished without performing a route search. This prevents improper route guidance in the case where the ordinary road that the vehicle has entered immediately after exiting the expressway is an ordinary road for which road data is not stored in the external storage device 58.

(4) In the embodiment, if the user activates the re-search switch of the input section 55 ("yes" at step S243), the computation section 53 performs route guidance by performing a route search using the road data in the external storage device 58. Therefore, even if a communication failure has occurred, route guidance can be performed according to the user's intention by performing map matching and a route search using the road data for ordinary roads stored in the external storage section 58.

(5) In the third embodiment, route information used as basis for the judgement whether the vehicle has exited the expressway and entered an ordinary road is reception of optical beacon information that is transmitted from existing optical beacons. Therefore, such a judgment can be made without the need for installing special facilities.

(6) In the third embodiment, route information used as basis for the judgement whether the vehicle has exited the expressway and entered an ordinary road is the shape of the road travelled by the vehicle. The shape of each road section of a predetermined length is calculated and it is judged that the vehicle has exited the expressway and entered an ordinary road if the calculated road shape coincides with the shape (loop shape) of an interchange. Therefore, whether the vehicle has entered an ordinary road at an interchange can be judged without the need for providing a special device.

(7) In the third embodiment, if it is judged that the vehicle was not running on the expressway when the communication failure occurred ("no" at step S250), the computation section 53 prohibits map matching and a route search using the road data that is stored in the external storage section 58 (step S245). Therefore, in the case where the vehicle was running on a road that is not the expressway (or toll road), such as a new bypass that is provided with optical beacons, when the communication failure occurred and the road data for that road is not stored in the external storage device 58 of the vehicular apparatus 2, the vehicular apparatus 2 does not perform improper map matching or improper route guidance.

Embodiment 4

A communication-type car navigation system according to a fourth embodiment of the invention will be described with reference to FIG. 17. The communication-type car navigation system according to the fourth embodiment is different from that according to the second embodiment only in the manner in which the computation section 53 of the vehicular apparatus 2 operates when the communication with the information center 1 has failed. Therefore, for convenience of description, this embodiment will be described only for that point.

Figure 17:
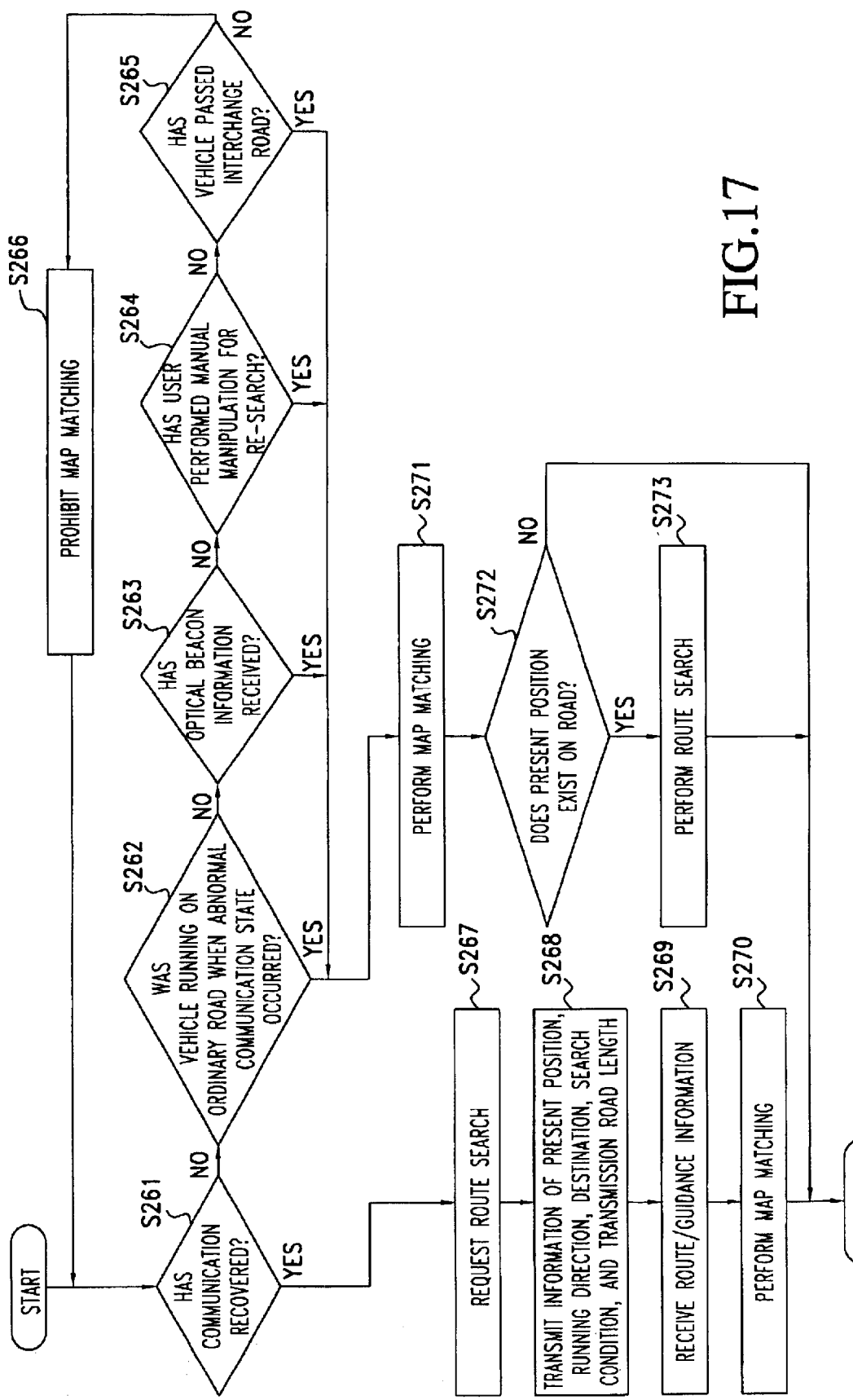
FIG. 17 is a flowchart of a routine for route guidance executed by the vehicular apparatus when normal communication with the information delivery center is not possible, according to a fourth embodiment of the invention.

FIG. 17 is a flowchart showing an operation that is performed by the computation section 53 of the vehicular apparatus 2 by execution of the communication failure countermeasure program 67 when route guidance information for a route ahead of the present position is not available because a communication failure has occurred during route guidance based on route guidance information transmitted from the information center 1.

First, the computation section 53 judges whether communication with the information center 1 has recovered (step S261). If communication has not recovered yet ("no" at step S261), the computation section 53 judges, based on the type data for the road on which the vehicle was travelling immediately before the communication failure occurred, whether the vehicle was travelling on an ordinary road at the time of the occurrence (step S262). If the vehicle was travelling on an expressway (or a toll road) at the time of occurrence of the communication failure ("no" at step S262), the computation section 53 judges whether optical beacon information has been received (step S263), that is, whether the vehicle has entered onto an ordinary road.

If no optical beacon information has been received ("no" at step S263), the computation section 53 judges whether a re-search switch of the input section 55 has been activated (step S264). That is, the computation section 53 judges whether the user has performed a manual action to cause the vehicular apparatus 2 to again search for a route to the destination using the road data of the external storage device 58 by executing the route search program 65.

If the user does not want a re-search ("no" at step S264), the computation section 53 judges whether the vehicle has passed an interchange at which to exit the expressway (step S265). Specifically, as in the case of the third embodiment, the computation section 53 calculates curvature of each section, having a predetermined length, of the road on which the vehicle is travelling and judges whether the calculated curvature which represents a road shape coincides with curvature of a looped interchange that is stored in advance in the memory 54.

If the computation section 53 judges that the vehicle has not exited the expressway at an interchange to enter an ordinary road ("no" at step S265), the computation section 53 prohibits map matching (step S266). That is, the computation section 53 prohibits map matching in accordance with a judgment that the vehicle continues to travel the expressway after the occurrence of the communication failure and the re-search switch of the input section 55 has not been activated. Since map matching has been prohibited, the process goes to step S261 without again searching for a route to the destination. At step S261, the computation section 53 again judges whether communication with the information center 1 has been restored.

As described above, the computation section 53 of the vehicular apparatus 2 does not perform map matching or a re-search if a communication failure has occurred while the vehicle was travelling on an expressway and the vehicle is still travelling that expressway without ability to communicate with the information center. As a result, for example, in the case where the expressway where the abnormal communication failure occurred is a new expressway and the road data for the new expressway is not stored in the external storage device 58 of the vehicular apparatus 2, the vehicular apparatus 2 does not perform improper display and route guidance wherein the vehicle present position would be erroneously indicated to be on an ordinary road for which road data is stored in the external storage device 58, rather than on the new expressway, by map matching.

If communication with the information center 1 recovers while the vehicle is travelling with map matching and route re-search prohibited ("yes" at step S261), the computation section 53 requests the information center 1 to perform a route search (step S267) and transmits, to the information center 1, information for the vehicle present position, travel direction, type of road on which the present position is located, destination, transmission road segment length, and search condition (step S268).

The vehicular apparatus 2 receives route guidance information generated by the information center 1 in due course (step S269) and the computation section 53 performs map matching based on the received route guidance information (route guidance data 71) (step S270). From this time forward, the vehicular apparatus 2 executes route guidance based on the route guidance information (route guidance data 71) received in communication with the information center 1.

On the other hand, if the vehicle was running on an ordinary road when the communication failure occurred ("yes" at step S262) or if the vehicle has exited the expressway and entered an ordinary road ("yes" at step S263 or S265), the computation section 53 performs map matching using the road data in the external storage device 58, judging that the road data for the road on which the vehicle is now travelling is stored in the external storage device 58 (step S271).

If the road on which vehicle present position is located is found by the map matching ("yes" at step S272), the computation section 53 searches for a route from the present position to the destination by execution of the route search program 65 (step S273). From this time forward, the vehicular apparatus 2 provides route guidance by executing the route guidance program 61 using the road data of the external storage device 58 until communication with the information center 1 is restored. Conversely, if the road on which the vehicle present position is located cannot be found by the map matching ("no" at step S272), the computation section 53 finishes the execution of the program without performing a route search. That is, the computation section 53 does not perform a route search because of a judgment that the ordinary road on which the vehicle is travelling is a road for which road data is not stored in the external storage device 58 and a route search with forcible map matching to an ordinary road for which road data is stored in the external storage device 58 would lead to improper route guidance.

If the re-search switch of the input section 55 has been activated ("yes" at step S264), the computation section 53 performs map matching using the road data stored in the external storage device 58 according to the user's intention (step S271). From this time forward, the computation section 53 executes steps S272 and S273 as in the above-described case and finishes the execution of the program.

The advantages of the above communication-type car navigation system according to the fourth embodiment are as follows.

(1) In this fourth embodiment, if a communication failure occurs while the vehicle is travelling on an ordinary road with route guidance based on route guidance information transmitted from the information center 1 ("yes" at step S262), the computation section 53 performs map matching and a route search using the road data of the external storage device 58.

Therefore, when a communication failure occurs while the vehicle is travelling on an ordinary road, the vehicular apparatus 2 can immediately start proper route guidance display.

(2) In the fourth embodiment, if the communication with the information center 1 is lost while the vehicle is travelling on an expressway (or a toll road) and there is no remaining portion of the route that is associated with route guidance information, the computation section 53 prohibits map matching and route searching using the road data of the external storage section 58 as long as the vehicle continues to travel on the expressway ("no" at steps S263 and S265).

Therefore, in the case where the expressway on which the communication failure occurred is a new expressway and the road data for the new expressway is not stored in the external storage device 58 of the vehicular apparatus 2, the computation section 53 of the vehicular apparatus 2 does not perform improper route guidance display by substituting road data for an ordinary road (not the new expressway), which would result in erroneous map matching, route searching and route guidance.

(3) In the fourth embodiment, if the communication with the information center 1 is lost while the vehicle is travelling on an expressway (or a toll road) and there remains no route portion that is associated with route guidance information, the computation section 53 performs map matching and a route search using the road data of the external storage section 58 after the vehicle has exited the expressway and entered an ordinary road ("yes" at step S263 or S265).

Therefore, if the expressway where the communication failure occurred is a new expressway and the road data for the new expressway is not stored in the external storage device 58 of the vehicular apparatus 2, the vehicular apparatus 2 performs map matching and a route search using the road data stored in the external storage device 58 until the vehicle exits the expressway and enters onto an ordinary road. Therefore, proper route guidance display can be started automatically after the vehicle has entered onto the ordinary road. As a result, no improper route guidance display is performed in the interval between the communication failure and the exit of the vehicle from the expressway.

(4) In the fourth embodiment, if map matching does not place the vehicle present position on an ordinary road after the vehicle has exited the expressway, the route guidance operation is then completed without performing a route search. This prevents improper route guidance in the case where the ordinary road that the vehicle has entered immediately after exiting the expressway is an ordinary road for which road data is not stored in the external storage device 58.

(5) In the fourth embodiment, if the user activates the re-search switch of the input section 55 ("yes" at step S264), the computation section 53 conducts a route search using the road data of the external storage device 58. Therefore, even if a communication failure has occurred, route guidance can be performed according to the user's intention by performing map matching and a route search using the road data for ordinary roads stored in the external storage section 58.

(6) In the fourth embodiment, the route information serving as basis for a judgement whether the vehicle has exited the expressway and entered an ordinary road is reception of optical beacon information that is transmitted from existing optical beacons. Therefore, such a judgment can be made without the need for installing special facilities.

(7) In the fourth embodiment, the route information serving as basis for a judgement whether the vehicle has exited the expressway and entered an ordinary road is the shape of the road on which the vehicle is traveling. The shape of each segment of a predetermined length of the road on which the vehicle is travelling is calculated and it is judged that the vehicle has exited the expressway and entered onto an ordinary road if the calculated road shape coincides with the shape (loop shape) of an interchange. Therefore, whether the vehicle has entered onto an ordinary road at an interchange can be judged without the need for providing a special device.

The third and fourth embodiments of the invention may be modified in the following manners:

In the third and fourth embodiments, the route information serving as basis for a judgement whether the vehicle has exited an expressway and entered an ordinary road is optical beacon information or the shape of the road on which the vehicle is travelling. Alternatively, for example, in the case of a vehicle equipped with an ETC (electronic toll collection) device, whether the vehicle has exited an expressway and entered an ordinary road may be judged by receiving a signal transmitted from a tollbooth with an antenna and the ETC system device when the vehicle travels through a tollbooth passage lane (ECT lane).

In the third and fourth embodiments, a transmission road segment length is transmitted from the vehicular apparatus 2 to the information center 1 and the information center 1 generates route guidance information to be transmitted in one transmission attempt based on the received transmission road length. Alternatively, the information center 1 may determine a transmission road length, generate route guidance information corresponding to that determined road length, and transmit it to the vehicular apparatus 2 in one transmission attempt.

At step S243 of the third embodiment and step S264 of the fourth embodiment, the user gives a re-search instruction by a manual operation, that is, activation of the re-search switch of the input section 55. Alternatively, the user may give a re-search instruction by voice using a speech recognition device.

In the third and fourth embodiments, if the communication with the information center 1 is lost while the vehicle is running on an expressway and there remains no route portion associated with route guidance information, the computation section 53 prohibits map matching using the road data of the external storage section 58 (step S245 or S266) as long as the vehicle continues to run on the expressway.

Instead of prohibiting map matching, the road matching condition may made stricter. In the map matching, present position information and a past locus are compared with road shapes on a map and the present position marking position is corrected so as to be located on the proper road. For example, if the present position marking position is usually corrected so as to be located on the most proper road among those roads whose deviations are less than X, the map matching condition may be made stricter so that the present position marking position is corrected so as to be located on the most proper road among roads whose deviations are less than Y.

According to the present invention, if an expressway where a communication failure occurred is a new expressway and the road data for the new expressway is not stored in the road data storing means, the re-search means of the vehicular route guidance apparatus does not perform a route search using the road data of the road data storing means unless the vehicle exits the expressway and enters onto an ordinary road. Therefore, improper route guidance using an ordinary road for which road data is stored in the road data storing means, rather than the new expressway, is not performed.

According to the present invention, if a failure occurs in communication with the information delivery center while the vehicle is travelling on an ordinary road, the re-search means of the vehicular route guidance apparatus performs a route search using the road data for the ordinary road that is stored in the road data storing means. Therefore, the vehicular route guidance apparatus can immediately start proper route guidance display.

Further, according to the invention, the re-search means performs a re-search only if map matching has placed the present position on an ordinary road. This can prevent improper route guidance in the case where the road data for the ordinary road is not stored in the road data storing means.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

INCORPORATION BY REFERENCE

The teachings of Japanese Application No. 2001-243427, filed Aug. 10, 2001, Japanese Application No. 2001-241746 filed Aug. 9, 2001 and Japanese Application No. 2001-245047 filed Aug. 10, 2001 are incorporated by reference herein in their entirety, inclusive of the specification, claims and drawings.

What is claimed is:

1. A navigation system comprising:
   (a) an information center comprising an information center side transmission/reception section for communication, a route search section for searching for a route, based on a present position and destination, and an information generating section for generating guidance information for guidance along the route found by the route search section and for extracting major guide point information for major guide points, along the route found by the route search section, from the guidance information; and
   (b) a vehicular apparatus comprising a destination setting section for setting a destination, a present position determination section for determining the present position, and a guidance output section for outputting major guide point information including all major guide points on the route found by the route search section and additional route guidance information, a vehicle side transmission/reception section for transmitting the set destination and the determined present position to the information center and for receiving the major guide point information during a first period of transmission from the information center and for receiving the additional route guidance information during a second period of transmission from the information center, subsequent to said first period, and storage means for storing the received information, said guidance output section giving guidance limited to the major guide point information when the vehicle side transmission/reception section is unable to receive the additional route guidance information from the information center.

2. The navigation system according to claim 1, wherein the vehicular apparatus repeatedly updates the present position and transmits the updated present position to the information center, and the information center updates the guidance information based on the updated present position and transmits the updated guidance information to the vehicular apparatus.

3. An information center comprising:
(a) a transmission/reception section for communication;
(b) a route search section for searching for a route; and
(c) an information generating section for generating guidance information for the route found by the route search section, said guidance information including major guide point information relating to major guide points along the route found, wherein the information center searches for the route based on a present position and a destination that are received from a vehicular apparatus and firstly transmits, to the vehicular apparatus, generated major guide point information taken from the guidance information and subsequently transmits the remaining guidance information.

4. The information center according to claim 3, wherein the major guide point information includes a name of an interchange of one of an expressway, a toll road, or a high level of a multi-level road.

5. The information center according to claim 4, wherein if an end, most distant from the present position, of a segment of the found route having a prescribed road length is on an expressway, toll road or a high level of a multi-level road, the information center transmits the name of the interchange to the vehicular apparatus.

6. A vehicular apparatus for use in a vehicle comprising:
(a) a transmission/reception section for communication;
(b) a destination setting section for setting a destination;
(c) a present position determination section for determining a present position; and
(d) a guidance output section for outputting guidance information including major guide point information relating to major guide points and additional route guidance information, wherein the vehicular apparatus transmits the destination and the present position to an information center, and receives, from the information center, firstly, major guide point information and, subsequently, route guidance information for route guidance along a route that has been found by a search based on the destination and the present position, and gives guidance for the major guide points received first when unable to receive the additional route guidance information, wherein the major guide point information includes information for plural major guide points along the route which has been found by the search.

7. The vehicular apparatus according to claim 6 wherein: said transmission/reception section receives plural transmissions, each transmission first conveying, within a first period of transmission, the major guide point information for a segment of the found route, followed by the additional route guidance information for the segment of the found route, within a second period of transmission which is significantly longer than the first period of transmission, and wherein the segments of the plural transmissions each have a prescribed length.

8. The vehicular apparatus according to claim 6, wherein the vehicular apparatus does not give guidance for a major guide point that the vehicle has already passed.

9. A route guidance system comprising:
an information delivery center for generating route guidance information for route segments of a recommended route from a present position to a destination in response to a request from a vehicular route guidance apparatus and for transmitting the generated route guidance information to the vehicular route guidance apparatus in a series of transmissions, each transmission providing guidance information for a route segment of the recommended route, each route segment having a prescribed length, the information delivery center comprising:
search means for searching for the recommended route from the present position to the destination;
preliminary route guidance information generating means for generating, if an end of a route segment, for which the preceding transmission provided guidance information, is on an expressway or a toll road, preliminary route guidance information for a preliminary route from the route segment end to an escape position, ahead of the route segment end, on the expressway or toll road;
remaining route guidance information generating means for generating remaining route guidance information for a remaining route that is a route segment of the prescribed road length minus the preliminary route;
transmitting means for first transmitting the preliminary route guidance information to the vehicular route guidance apparatus and then transmitting the remaining route guidance information to the vehicular route guidance apparetus; and
wherein said vehicular route guidance apparatus performs route guidance using the route guidance information transmitted from the information delivery center, and comprises:
route guidance means for providing route guidance for the recommended route ahead of the route segment end, when communication with the information delivery center has failed, from the route segment end to an escape location on the expressway or toll road using the preliminary route guidance information that has been received.

10. The route guidance system according to claim 9, wherein the vehicular route guidance apparatus further comprises:
road data storing means in which road data is stored;
route search means for searching for a route to the destination using the road data of the road data storing means; and route guidance information generating means for generating route guidance information for guidance along the route that has been found by the route search means.

11. The route guidance system according to claim 9, wherein the escape location on the expressway or toll road is an escape location that is ahead of and closest to the route segment end.

12. The route guidance system according to claim 9, wherein the escape location on the expressway or toll road is an interchange, a service area, or a parking area.

13. An information center for receiving information for a present position and information for a destination from a vehicular route guidance apparatus, for generating route guidance information corresponding to segments of a recommended route, each segment having a prescribed road length, and for transmitting the generated route guidance information to the vehicular route guidance apparatus, the information delivery center comprising:

search means for searching for the recommended route from the present position to the destination;

preliminary route guidance information generating means for generating, if an end of a route segment which was is the subject of a preceding transmission of route guidance information is on an expressway or toll road, preliminary route guidance information for a preliminary route from the segment end to an escape location ahead on the expressway or toll road;

remaining route guidance information generating means for generating remaining route guidance information for a remaining route that is a segment of the recommended route having the prescribed road length minus the preliminary route; and transmitting means for first transmitting the preliminary route guidance information to the vehicular route guidance apparatus and then transmitting the remaining route guidance information to the vehicular route guidance apparatus.

14. A vehicular route guidance apparatus for receiving, in succession, transmissions of route guidance information from an information delivery center, each transmission containing guidance information for a segment of a recommended route, said segment having a prescribed road length, and for providing route guidance to a destination using route guidance information provided by the succession of transmissions, said vehicular route guidance apparatus comprising:

route guidance information storing means for receiving, from the information delivery center, preliminary route guidance information, generated when an end of a segment, which was the subject of route guidance information of a preceding transmission, is on an expressway or toll road, said preliminary route information corresponding to a preliminary route from the end of the segment to an escape location ahead on the expressway or toll road, and for receiving from the information center remaining route guidance information for a remaining route that is a segment of the recommended route having the prescribed road length minus the preliminary route, and for storing the remaining route guidance information and the preliminary route guidance information; and route guidance means for providing route guidance for the recommended route ahead of the segment end, when a failure occurs in communication with the information delivery center, from the segment end to the escape location on the expressway or toll road using the received preliminary route guidance information.

15. A route guidance system for a vehicle comprising:

an information delivery center for transmitting, to a vehicular route guidance apparatus, route guidance information for route guidance to a destination, said information delivery center comprising:

search means for searching for a recommended route to the destination; and transmitting means for transmitting, to the vehicular route guidance apparatus, route guidance information for guidance along the recommended route; and wherein the vehicular route guidance apparatus provides route guidance, based on the route guidance information transmitted from the information delivery center, and comprises:

data storage means in which road data is stored; and re-search means for again searching for a route using the stored road data, when a failure has occurred in communication with the information delivery center and the vehicle has exited an expressway or toll road.

16. The route guidance system according to claim 15, wherein the re-search means judges, based on route information, whether the vehicle has exited an expressway or toll road.

17. The route guidance system according to claim 15, wherein the re-search means searches for a route using the stored road data on condition that the failure in communication with the information delivery center occurred while the vehicle was travelling on a road other than the expressway or toll road.

18. The route guidance system according to claim 15, wherein the re-search means searches for a route again further on condition that the vehicular route guidance apparatus has not received information for the recommended route ahead of the present position of the vehicle.

19. The route guidance system according to claim 15, further comprising matching means for performing map matching of the vehicle present position when a failure in communication with the information delivery center has occurred and the vehicle has exited the expressway or toll road, and wherein the re-search means searches for a route again on condition that the map matching has placed the present position of the vehicle on a road other than the expressway or toll road.

20. A method for communication of guidance information between a central information center and plural vehicles each equipped with a vehicular navigation apparatus, said method comprising:

transmitting from the vehicular navigation apparatus to the central information center information identifying a present position of a vehicle and a destination;

searching, within the central information center, to determine a recommended route from the present vehicle position to the destination;

generating guidance information for the recommended route within the central information center;

transmitting the generated guidance information, as a series of transmissions, to the vehicular navigation apparatus, each of said transmissions providing guidance information for a segment of the recommended route having a prescribed length, the provided guidance information including guidance information for a plurality of points along the prescribed length of the segment, each of said transmissions including a first portion of guidance information of short duration to be utilized for guidance in the event of a failure in communication between the central information center and the vehicular navigation apparatus and a second portion of guidance information as additional, more detailed guidance information for the route segment, exclusive of the guidance information for the plurality of points and having a duration significantly longer than that of said first portion.

* * * * *

UNITED STATES PATENT AND TRADEMARK OFFICE
CERTIFICATE OF CORRECTION

PATENT NO. : 6,904,362 B2
DATED : June 7, 2005
INVENTOR(S) : Nakashima et al.

It is certified that error appears in the above-identified patent and that said Letters Patent is hereby corrected as shown below:

Column 43,
Line 22, delete "is".

Signed and Sealed this

Twenty-fifth Day of April, 2006

JON W. DUDAS
*Director of the United States Patent and Trademark Office*